US011022526B1

(12) United States Patent
Yeung et al.

(10) Patent No.: US 11,022,526 B1
(45) Date of Patent: Jun. 1, 2021

(54) SYSTEMS AND METHODS FOR MONITORING A CONDITION OF A FRACTURING COMPONENT SECTION OF A HYDRAULIC FRACTURING UNIT

(71) Applicant: BJ Energy Solutions, LLC, Houston, TX (US)

(72) Inventors: Tony Yeung, Tomball, TX (US); Ricardo Rodriguez-Ramon, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 16/946,172

(22) Filed: Jun. 9, 2020

(51) Int. Cl.
*F04B 51/00* (2006.01)
*G01M 99/00* (2011.01)
(Continued)

(52) U.S. Cl.
CPC ....... *G01M 99/005* (2013.01); *E21B 43/2607* (2020.05); *F04B 17/05* (2013.01); *F04B 51/00* (2013.01); *F04B 15/02* (2013.01)

(58) Field of Classification Search
CPC ..... E21B 43/26–23/267; G01M 99/005; F04B 17/05; F04B 51/00; F04B 15/02;
(Continued)

(56) References Cited

U.S. PATENT DOCUMENTS 2,498,229 A 2/1950 Adler
3,191,517 A 6/1965 Solzman
(Continued)

FOREIGN PATENT DOCUMENTS

CA 2876687 A1 5/2014
CA 2693567 9/2014
(Continued)

OTHER PUBLICATIONS

Europump and Hydrualic Institute, Variable Speed Pumping: A Guide to Successful Applications, Elsevier Ltd, 2004.
(Continued)

*Primary Examiner* — Bryan M Lettman
*Assistant Examiner* — Dnyanesh G Kasture
(74) *Attorney, Agent, or Firm* — Womble Bond Dickinson (US) LLP

(57) ABSTRACT

Systems and methods to monitor a condition of a fracturing component section including a section frame and a hydraulic fracturing component of a hydraulic fracturing unit to pump fracturing fluid connected to the section frame may include a condition monitoring controller configured to receive one or more signals from one or more sensors configured to be connected to the fracturing component section and generate signals indicative of operating parameters associated with operation of the fracturing component. The condition monitoring controller may be configured to generate, based at least in part on the signals, condition signals indicative of approaching maintenance due to be performed, predicted component damage, predicted component failure, existing component damage, existing component failure, irregularities of component operation, and/or operation exceeding rated operation. The systems and methods also may include exchanging the fracturing component for another fracturing component based at least in part on the condition signals.

14 Claims, 9 Drawing Sheets

(51) Int. Cl.
*E21B 43/26* (2006.01)
*F04B 17/05* (2006.01)
*F04B 15/02* (2006.01)

(58) Field of Classification Search
CPC ...... H01R 24/52; H01R 43/205; H01R 13/56; H01R 13/6395; H01R 13/74; H01R 13/741; H01R 13/743; H01R 13/745; H01R 13/746; H01R 13/748
USPC ..... 285/124.1–124.5, 136.1–143.1, 189–222
See application file for complete search history.

(56) References Cited

U.S. PATENT DOCUMENTS

| | | | |
|---|---|---|---|
| 3,257,031 A | 6/1966 | Dietz | |
| 3,378,074 A | 4/1968 | Kiel | |
| 3,739,872 A | 6/1973 | McNair | |
| 3,773,438 A | 11/1973 | Hall et al. | |
| 3,791,682 A | 2/1974 | Mitchell | |
| 3,796,045 A | 3/1974 | Foster | |
| 3,820,922 A | 6/1974 | Buse et al. | |
| 4,010,613 A | 3/1977 | McInerney | |
| 4,031,407 A | 6/1977 | Reed | |
| 4,086,976 A | 5/1978 | Holm et al. | |
| 4,222,229 A | 9/1980 | Uram | |
| 4,269,569 A | 5/1981 | Hoover | |
| 4,311,395 A | 1/1982 | Douthitt et al. | |
| 4,357,027 A | 11/1982 | Zeitlow | |
| 4,402,504 A | 9/1983 | Christian | |
| 4,457,325 A | 7/1984 | Green | |
| 4,470,771 A | 9/1984 | Hall et al. | |
| 4,574,880 A * | 3/1986 | Handke .................. | E21B 47/11 166/75.15 |
| 4,754,607 A | 7/1988 | Mackay | |
| 4,782,244 A | 11/1988 | Wakimoto | |
| 4,796,777 A | 1/1989 | Keller | |
| 4,913,625 A | 4/1990 | Gerlowski | |
| 4,983,259 A | 1/1991 | Duncan | |
| 4,990,058 A | 2/1991 | Eslinger | |
| 5,537,813 A | 7/1996 | Davis et al. | |
| 5,553,514 A | 9/1996 | Walkowc | |
| 5,560,195 A | 10/1996 | Anderson et al. | |
| 5,622,245 A | 4/1997 | Reik | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,983,962 A | 11/1999 | Gerardot | |
| 6,041,856 A | 3/2000 | Thrasher et al. | |
| 6,050,080 A | 4/2000 | Horner | |
| 6,071,188 A | 6/2000 | O'Neill et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,530,224 B1 | 3/2003 | Conchieri | |
| 6,543,395 B2 | 4/2003 | Green | |
| 6,655,922 B1 | 12/2003 | Flek | |
| 6,765,304 B2 | 7/2004 | Baten et al. | |
| 6,786,051 B2 | 9/2004 | Kristich et al. | |
| 6,851,514 B2 | 2/2005 | Han et al. | |
| 6,859,740 B2 | 2/2005 | Stephenson et al. | |
| 6,901,735 B2 | 6/2005 | Lohn | |
| 7,065,953 B1 | 6/2006 | Kopko | |
| 7,222,015 B2 | 5/2007 | Davis et al. | |
| 7,388,303 B2 | 6/2008 | Seiver | |
| 7,545,130 B2 | 6/2009 | Latham | |
| 7,552,903 B2 | 6/2009 | Dunn et al. | |
| 7,563,076 B2 | 7/2009 | Brunet et al. | |
| 7,627,416 B2 | 12/2009 | Batenburg et al. | |
| 7,677,316 B2 | 3/2010 | Butler et al. | |
| 7,721,521 B2 | 5/2010 | Kunkle et al. | |
| 7,730,711 B2 | 6/2010 | Kunkle et al. | |
| 7,845,413 B2 | 12/2010 | Shampine et al. | |
| 7,900,724 B2 | 3/2011 | Promersberger et al. | |
| 7,921,914 B2 | 4/2011 | Bruins et al. | |
| 7,938,151 B2 | 5/2011 | Höckner | |
| 7,980,357 B2 | 7/2011 | Edwards | |
| 8,083,504 B2 | 12/2011 | Williams et al. | |
| 8,186,334 B2 | 5/2012 | Ooyama | |
| 8,196,555 B2 | 6/2012 | Ikeda et al. | |
| 8,316,936 B2 | 11/2012 | Roddy et al. | |
| 8,414,673 B2 | 4/2013 | Raje et al. | |
| 8,506,267 B2 | 8/2013 | Gambier et al. | |
| 8,575,873 B2 | 11/2013 | Peterson et al. | |
| 8,616,005 B1 | 12/2013 | Cousino, Sr. et al. | |
| 8,621,873 B2 | 1/2014 | Robertson et al. | |
| 8,672,606 B2 | 3/2014 | Glynn et al. | |
| 8,714,253 B2 | 5/2014 | Sherwood et al. | |
| 8,770,329 B2 | 7/2014 | Spitler | |
| 8,789,601 B2 | 7/2014 | Broussard et al. | |
| 8,794,307 B2 | 8/2014 | Coquilleau et al. | |
| 8,851,441 B2 | 10/2014 | Acuna et al. | |
| 8,905,056 B2 | 12/2014 | Kendrick | |
| 8,973,560 B2 | 3/2015 | Krug | |
| 8,997,904 B2 | 4/2015 | Cryer et al. | |
| 9,032,620 B2 | 5/2015 | Frassinelli et al. | |
| 9,057,247 B2 | 6/2015 | Kumar et al. | |
| 9,103,193 B2 | 8/2015 | Coli et al. | |
| 9,121,257 B2 | 9/2015 | Coli et al. | |
| 9,140,110 B2 | 9/2015 | Coli et al. | |
| 9,187,982 B2 | 11/2015 | Dehring et al. | |
| 9,212,643 B2 | 12/2015 | Deliyski | |
| 9,341,055 B2 | 5/2016 | Weightman et al. | |
| 9,346,662 B2 | 5/2016 | Van Vliet et al. | |
| 9,366,114 B2 | 6/2016 | Coli et al. | |
| 9,376,786 B2 | 6/2016 | Numasawa | |
| 9,394,829 B2 | 7/2016 | Cabeen et al. | |
| 9,395,049 B2 | 7/2016 | Vicknair et al. | |
| 9,401,670 B2 | 7/2016 | Minato et al. | |
| 9,410,410 B2 | 8/2016 | Broussard et al. | |
| 9,410,546 B2 | 8/2016 | Jaeger et al. | |
| 9,429,078 B1 | 8/2016 | Crowe et al. | |
| 9,493,997 B2 | 11/2016 | Liu et al. | |
| 9,512,783 B2 | 12/2016 | Veilleux et al. | |
| 9,534,473 B2 | 1/2017 | Morris et al. | |
| 9,546,652 B2 | 1/2017 | Yin | |
| 9,550,501 B2 | 1/2017 | Ledbetter | |
| 9,556,721 B2 | 1/2017 | Jang et al. | |
| 9,562,420 B2 | 2/2017 | Morris et al. | |
| 9,570,945 B2 | 2/2017 | Fischer | |
| 9,579,980 B2 | 2/2017 | Cryer et al. | |
| 9,587,649 B2 | 3/2017 | Oehring | |
| 9,611,728 B2 | 4/2017 | Oehring | |
| 9,617,808 B2 | 4/2017 | Liu et al. | |
| 9,638,101 B1 | 5/2017 | Crowe et al. | |
| 9,638,194 B2 | 5/2017 | Wiegman et al. | |
| 9,650,871 B2 | 5/2017 | Oehring et al. | |
| 9,656,762 B2 | 5/2017 | Kamath et al. | |
| 9,689,316 B1 | 6/2017 | Crom | |
| 9,739,130 B2 | 8/2017 | Young | |
| 9,764,266 B1 | 9/2017 | Carter | |
| 9,777,748 B2 | 10/2017 | Lu et al. | |
| 9,803,467 B2 | 10/2017 | Tang et al. | |
| 9,803,793 B2 | 10/2017 | Davi et al. | |
| 9,809,308 B2 | 11/2017 | Aguilar et al. | |
| 9,829,002 B2 | 11/2017 | Crom | |
| 9,840,897 B2 | 12/2017 | Larson | |
| 9,840,901 B2 | 12/2017 | Oering et al. | |
| 9,850,422 B2 | 12/2017 | Lestz et al. | |
| 9,856,131 B1 | 1/2018 | Moffitt | |
| 9,863,279 B2 | 1/2018 | Laing et al. | |
| 9,869,305 B1 | 1/2018 | Crowe et al. | |
| 9,879,609 B1 | 1/2018 | Crowe et al. | |
| 9,893,500 B2 | 2/2018 | Oehring et al. | |
| 9,893,660 B2 | 2/2018 | Peterson et al. | |
| 9,920,615 B2 | 3/2018 | Zhang et al. | |
| 9,945,365 B2 | 4/2018 | Hernandez et al. | |
| 9,964,052 B2 | 5/2018 | Millican et al. | |
| 9,970,278 B2 | 5/2018 | Broussard et al. | |
| 9,981,840 B2 | 5/2018 | Shock | |
| 9,995,102 B2 | 6/2018 | Dillie et al. | |
| 9,995,218 B2 | 6/2018 | Oehring et al. | |

(56) References Cited

U.S. PATENT DOCUMENTS

| | | |
|---|---|---|
| 10,008,880 B2 | 6/2018 | Vicknair et al. |
| 10,018,096 B2 | 7/2018 | Wallimann et al. |
| 10,020,711 B2 | 7/2018 | Oehring et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,349 B2 | 8/2018 | Álvarez et al. |
| 10,082,137 B2 | 9/2018 | Graham et al. |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,865,624 B1 | 12/2020 | Cui et al. |
| 10,865,631 B1 | 12/2020 | Zhang et al. |
| 10,895,202 B1 | 1/2021 | Yeung et al. |
| 10,907,459 B1 | 2/2021 | Yeung et al. |
| 10,954,770 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 2004/0016245 A1 | 1/2004 | Pierson |
| 2004/0187950 A1 | 9/2004 | Cohen et al. |
| 2005/0139286 A1 | 6/2005 | Poulter |
| 2005/0226754 A1 | 10/2005 | Orr et al. |
| 2006/0061091 A1* | 3/2006 | Osterloh ............... B01L 9/00 285/124.5 |
| 2006/0113384 A1* | 6/2006 | Kurita ............... B66C 13/46 235/385 |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0124191 A1 | 5/2009 | Van Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1* | 3/2011 | Gambier ............... F04B 49/065 417/63 |
| 2011/0054704 A1 | 3/2011 | Karpman et al. |
| 2011/0085924 A1 | 4/2011 | Shampine et al. |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Surnilla et al. |
| 2012/0199001 A1 | 8/2012 | Chillar et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0044517 A1 | 2/2014 | Saha et al. |
| 2014/0048253 A1 | 2/2014 | Andreychuk |
| 2014/0090742 A1 | 4/2014 | Coskrey et al. |
| 2014/0130422 A1 | 5/2014 | Laing et al. |
| 2014/0147291 A1 | 5/2014 | Burnette |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0275891 A1 | 10/2015 | Chong et al. |
| 2015/0369351 A1 | 12/2015 | Hermann et al. |
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0186671 A1 | 6/2016 | Austin et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0082110 A1 | 3/2017 | Lammers |
| 2017/0089189 A1 | 3/2017 | Norris et al. |
| 2017/0145918 A1 | 5/2017 | Oehring et al. |

(56) References Cited

U.S. PATENT DOCUMENTS

| | | |
|---|---|---|
| 2017/0218727 A1 | 8/2017 | Oehring et al. |
| 2017/0226839 A1 | 8/2017 | Broussard et al. |
| 2017/0227002 A1 | 8/2017 | Mikulski et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0334448 A1 | 11/2017 | Schwunk |
| 2017/0350471 A1 | 12/2017 | Steidl et al. |
| 2017/0370199 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1* | 11/2018 | Bishop ............... E21B 43/26 |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1* | 8/2019 | Botting ............... F04B 17/03 |
| 2019/0277295 A1 | 9/2019 | Clyburn et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0356199 A1 | 11/2019 | Morris et al. |
| 2020/0003205 A1 | 1/2020 | Stokkevag et al. |
| 2020/0040878 A1* | 2/2020 | Morris ............... F04B 17/05 |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meck et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1* | 8/2020 | Putz ............... A01B 76/00 |
| 2020/0309113 A1 | 10/2020 | Hunter et al. |
| 2020/0325752 A1* | 10/2020 | Clark ............... E21B 34/025 |
| 2020/0325760 A1 | 10/2020 | Markham |
| 2020/0325761 A1 | 10/2020 | Williams |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0392826 A1 | 12/2020 | Cui et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0408071 A1 | 12/2020 | Li et al. |
| 2020/0408144 A1 | 12/2020 | Feng et al. |
| 2020/0408147 A1 | 12/2020 | Zhang et al. |
| 2021/0071574 A1 | 3/2021 | Feng et al. |
| 2021/0071579 A1 | 3/2021 | Li et al. |
| 2021/0071752 A1 | 3/2021 | Cui et al. |

FOREIGN PATENT DOCUMENTS

| | | |
|---|---|---|
| CA | 2876687 C | 4/2019 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |

(56) References Cited

FOREIGN PATENT DOCUMENTS

| | | | |
|---|---|---|---|
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |

(56) References Cited

FOREIGN PATENT DOCUMENTS

| | | | |
|---|---|---|---|
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |

(56) References Cited

FOREIGN PATENT DOCUMENTS

| | | |
|---|---|---|
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108868675 A | 11/2018 |
| CN | 208086829 | 11/2018 |
| CN | 208089263 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |

(56) References Cited

FOREIGN PATENT DOCUMENTS

| | | |
|---|---|---|
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4241614 | 6/1994 |
| DE | 102012018825 | 3/2014 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3354866 | 8/2018 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 2012139380 | 10/2012 |
| WO | 2013185399 | 12/2013 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019200510 | 10/2019 |
| WO | 2019210417 | 11/2019 |
| WO | 2020018068 | 1/2020 |
| WO | 2020072076 | 4/2020 |
| WO | 2020104088 | 5/2020 |
| WO | 2020131085 A1 | 6/2020 |
| WO | 2020211083 | 10/2020 |
| WO | 2020211086 | 10/2020 |

OTHER PUBLICATIONS

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia,Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

(56) References Cited

OTHER PUBLICATIONS

Kas'yanov et al., Application of gas-turbine engines in pumping units complexes of hydraulic fracturing of oil and gas reservoirs; Exposition Oil & Gas; (Oct. 2012) (published in Russian).
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall. com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac_aspx.
PLOS ONE, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.
Cameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., WS-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities ourenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia.
Blago Minovski, Coupled Simulations of Cooling and Engine Systems for Unsteady Analysis of the Benefits of Thermal Engine Encapsulation, Department of Applied Mechanics, Chalmers University of Technology ,Göoteborg, Sweden 2015.
J. Porteiro et al., Feasibility of a new domestic CHP trigeneration with heat pump: II. Availability analysis. Design and development, Applied Thermal Engineering 24 (2004) 1421-1429.
AFGlobal Corporation, Durastim Hydraulic Fracturing Pump, a Revolutionary Design for Continuous Duty Hydraulic Fracturing, 2018.

\* cited by examiner

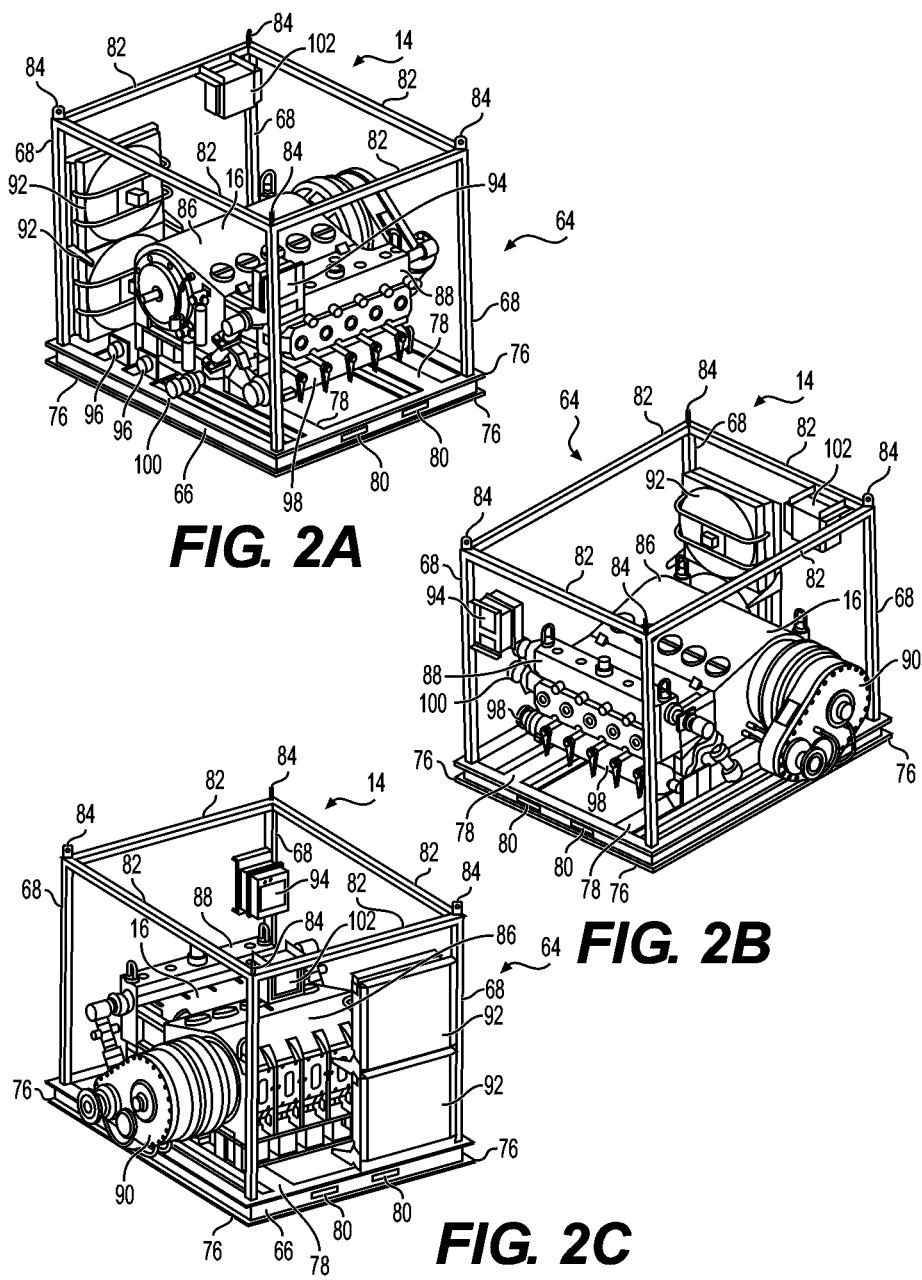

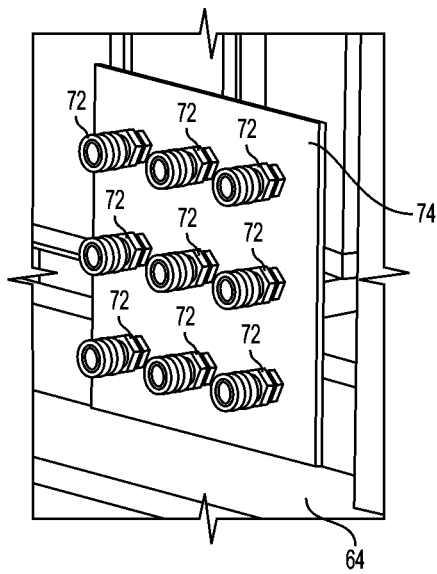
FIG. 4
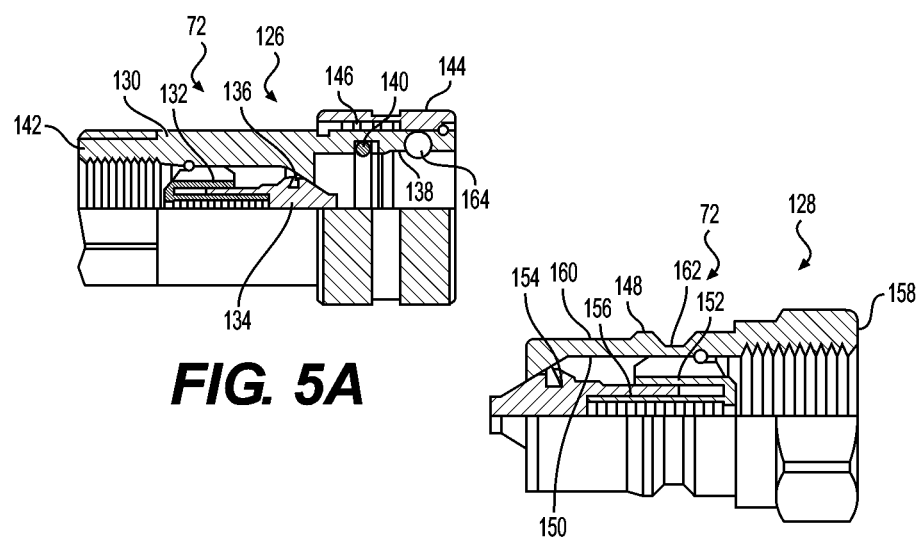
FIG. 5A
FIG. 5B

SYSTEMS AND METHODS FOR MONITORING A CONDITION OF A FRACTURING COMPONENT SECTION OF A HYDRAULIC FRACTURING UNIT

TECHNICAL FIELD

The present disclosure relates to systems and methods for monitoring a condition of a fracturing component section and, more particularly, to systems and methods for monitoring a condition of a fracturing component section of a hydraulic fracturing unit.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Prime movers may be used to supply power to hydraulic fracturing pumps for pumping the fracturing fluid into the formation. For example, a plurality of internal combustion engines may each be mechanically connected to a corresponding hydraulic fracturing pump via a transmission and operated to drive the hydraulic fracturing pump. The internal combustion engine, hydraulic fracturing pump, transmission, and auxiliary components associated with the internal combustion engine, hydraulic fracturing pump, and transmission may be connected to a common platform or trailer for transportation and set-up as a hydraulic fracturing unit at the site of a fracturing operation, which may include up to a dozen or more of such hydraulic fracturing units operating together to perform the fracturing operation.

A hydraulic fracturing operation is demanding on equipment, which often results in components of the hydraulic fracturing operation becoming worn, broken, or in need of maintenance, service, or, in some instances, replacement. Some maintenance issues are relatively minor and can be quickly remedied on-site. However, other maintenance issues may require separation of the affected component from the hydraulic fracturing unit and transport to an off-site location for service. In some instances, an affected component may require replacement. Many hydraulic fracturing unit components are large, heavy, and cumbersome to separate from the hydraulic fracturing unit. In addition, many of the hydraulic fracturing unit components operate with the assistance of numerous auxiliary components that may often include complex electrical and fluid systems, such as electrical components, wiring harnesses, fuel lines, hydraulic lines, lubrication lines, and cooling lines. Thus, if a hydraulic fracturing unit component requires separation from the hydraulic fracturing unit, it is often a difficult and complex process to separate the affected component from the remainder of the hydraulic fracturing unit, requiring the disconnection of numerous electrical and fluid components and lines. As a result, it may be required to interrupt a fracturing operation for a lengthy period of time in order to separate a fracturing component from its corresponding hydraulic fracturing unit and install a replacement component, increasing down-time and reducing the efficiency and profitability of the fracturing operation.

Accordingly, Applicant has recognized a need for systems and methods that provide greater efficiency and/or reduced down-time when performing a fracturing operation. The present disclosure may address one or more of the above-referenced drawbacks, as well as other possible drawbacks.

SUMMARY

The present disclosure generally is directed to systems and methods for monitoring a condition of a fracturing component section including one or more components of a hydraulic fracturing unit. According to some embodiments, a component condition monitoring system to connect to a fracturing component section of a high power hydraulic fracturing unit to pump fracturing fluid into a subterranean formation may include a fracturing component section configured to be mounted to a high power hydraulic fracturing unit to pump fracturing fluid. The fracturing component section may include a section frame. The component condition monitoring system also may include a hydraulic fracturing component connected to and supported by the section frame. The component condition monitoring system further may include a plurality of sensors connected to the fracturing component section and positioned to generate one or more signals indicative of operating parameters associated with operation of the fracturing component section. The component condition monitoring system still further may include a condition monitoring controller connected to the section frame and positioned to receive one or more signals from one or more of the plurality of sensors, and generate, based at least in part on the one or more signals, condition signals indicative of one or more of approaching maintenance due to be performed, predicted component damage, predicted component failure, existing component damage, existing component failure, irregularities of component operation, or operation exceeding rated operation.

According to some embodiments, a component condition monitoring system to connect to a fracturing component section including a section frame and a hydraulic fracturing component connected to the section frame may include a plurality of sensors positioned to connect to the fracturing component section and generate one or more signals indicative of operating parameters associated with operation of the hydraulic fracturing component. The component condition monitoring system also may include a condition monitoring controller configured to receive one or more signals from one or more of the plurality of sensors, and generate, based at least in part on the one or more signals, condition signals indicative of one or more of approaching maintenance due to be performed, predicted component damage, predicted component failure, existing component damage, existing component failure, irregularities of component operation, or operation exceeding rated operation.

According to some embodiments, a method to monitor a condition of a first fracturing component section including a first hydraulic fracturing component of a hydraulic fracturing unit and to exchange the first fracturing component section for a second fracturing component section including a second hydraulic fracturing component, may include receiving, via a condition monitoring controller, one or more signals from one or more of a plurality of sensors connected to the first fracturing component section. The method also may include generating, based at least in part on the one or more signals, one or more condition signals associated with the first fracturing component section. The method further may include one or more of communicating the one or more condition signals (1) via an output device in communication with the condition monitoring controller, to an on-site operator of the first fracturing component section, or (2) via a transmitter to a location remote from the first fracturing component section. The method still further may include exchanging, based at least in part on the communicating, the first fracturing component section for a second fracturing component section including a second hydraulic fracturing component.

According to some embodiments, a method to monitor a condition of a fracturing component section including a section frame and a hydraulic fracturing component connected to the section frame, may include receiving, via a condition monitoring controller, one or more signals from one or more of a plurality of sensors. The plurality of sensors may be connected to the fracturing component section and positioned to generate one or more signals indicative of operating parameters associated with operation of the hydraulic fracturing component. The method also may include generating, based at least in part on the one or more signals, condition signals indicative of one or more of approaching maintenance due to be performed, predicted component damage, predicted component failure, existing component damage, existing component failure, irregularities of component operation, or operation exceeding rated operation.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 2A is a perspective view of an example fracturing component section according to an embodiment of the disclosure.

FIG. 2B is perspective view of the example fracturing component section shown in FIG. 2A shown from a different side according to an embodiment of the disclosure.

FIG. 2C is perspective view of the example fracturing component section shown in FIG. 2A shown from a different side according to an embodiment of the disclosure.

FIG. 4 is a perspective view of an example coupling plate including a plurality of quick-connect fluid couplers connected to the coupling plate according to an embodiment of the disclosure.

FIG. 5A is a side section view of an example receptacle of a quick-connect fluid coupler for connecting to a coupling plate according to an embodiment of the disclosure.

FIG. 5B is a side section view of an example plug for connection to the quick-connect fluid coupler receptacle shown in FIG. 5B according to an embodiment of the disclosure.

DETAILED DESCRIPTION

The drawings like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
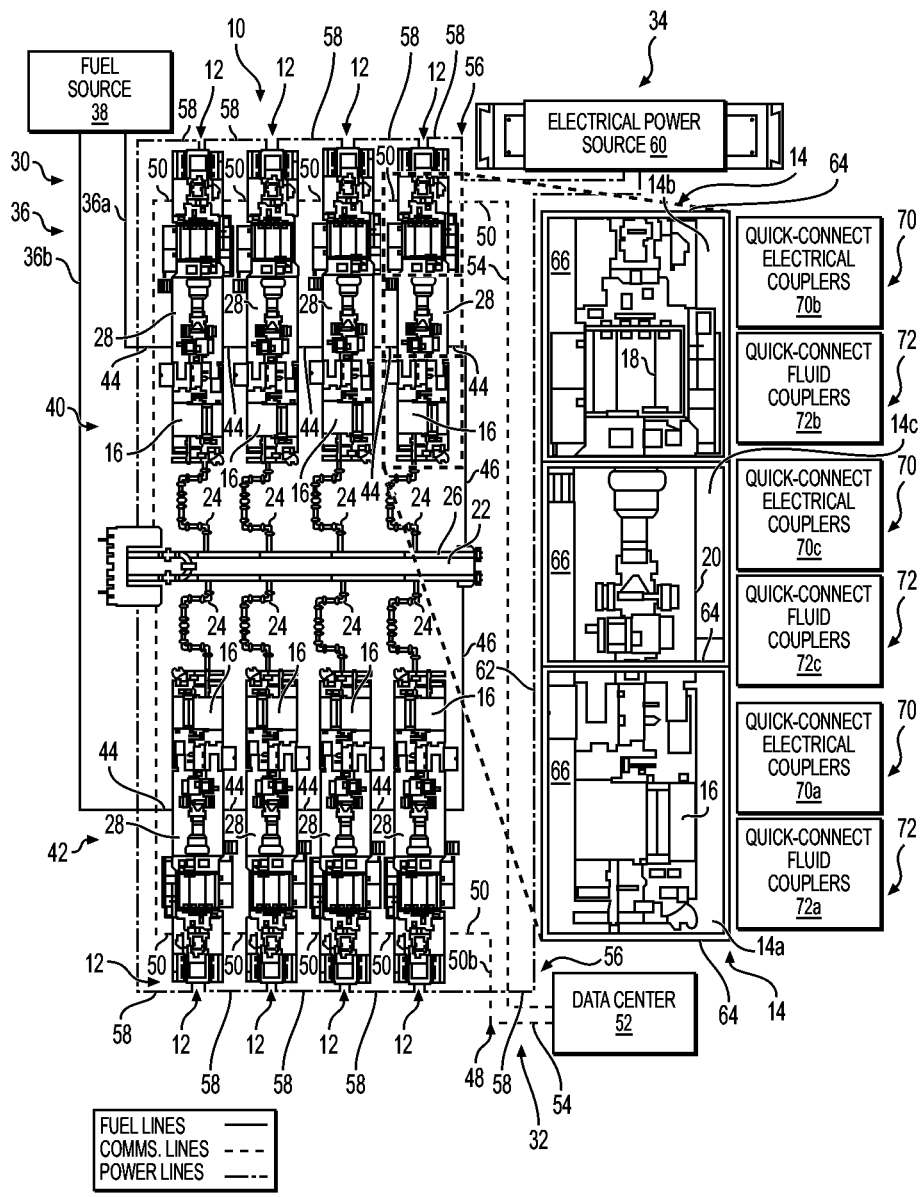
FIG. 1 schematically illustrates an example hydraulic fracturing system including a plurality of hydraulic fracturing units, including a detailed schematic view of example hydraulic fracturing component sections according to an embodiment of the disclosure.

FIG. 1 schematically illustrates an embodiment of a hydraulic fracturing system 10 including a plurality of hydraulic fracturing units 12, and includes a detailed schematic view of a plurality of hydraulic fracturing component sections 14 according to embodiments of the disclosure. The example hydraulic fracturing system 10 shown in FIG. 1 includes a plurality (or fleet) of hydraulic fracturing units 12 configured to pump a fracturing fluid into a well at high pressure and high flow rates, so that a subterranean formation may fail and begin to fracture in order to promote hydrocarbon production from the well.

In some embodiments, one or more of the hydraulic fracturing units 12 may include a fracturing pump 16 driven by an internal combustion engine 18 (e.g., a gas turbine engine (GTE) and/or diesel engine). In some embodiments, each of the hydraulic fracturing units 12 include directly driven turbine (DDT) hydraulic fracturing pumps 16, in which the hydraulic fracturing pumps 16 are connected to one or more GTEs that supply power to the respective hydraulic fracturing pump 16 for supplying fracturing fluid at high pressure and high flow rates to a formation. For example, a GTE may be connected to a respective hydraulic fracturing pump 16 via a transmission 20 (e.g., a reduction transmission) connected to a drive shaft, which, in turn, is connected to a driveshaft or input flange of a respective hydraulic fracturing pump 16 (e.g., a reciprocating hydraulic fracturing pump). Other types of engine-to-pump arrangements are contemplated.

In some embodiments, one or more of the internal combustion engines 18 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and sources of fuel and associated fuel supply sources are contemplated. The one or more internal combustion engines 18 may be operated to provide horsepower to drive via a transmission connected to one or more of the hydraulic fracturing pumps 16 to safely and successfully fracture a formation during a well stimulation project or fracturing operation.

Although not shown in FIG. 1, as will be understood by those skilled in the art, the hydraulic fracturing system 10 may include a plurality of water tanks for supplying water for a fracturing fluid, one or more chemical tanks for supplying gels or agents for adding to the fracturing fluid, and a plurality of proppant tanks (e.g., sand tanks) for supplying proppants for the fracturing fluid. The hydraulic fracturing system 10 may also include a hydration unit for mixing water from the water tanks and gels and/or agents from the chemical tank to form a mixture, for example, gelled water. The hydraulic fracturing system 10 may also include a blender, which receives the mixture from the hydration unit and proppants via conveyers from the proppant tanks. The blender may mix the mixture and the proppants into a slurry to serve as fracturing fluid for the hydraulic fracturing system 10. Once combined, the slurry may be discharged through low-pressure hoses, which convey the slurry into two or more low-pressure lines in a frac manifold 22, as shown in FIG. 1. Low-pressure lines in the frac manifold 22 feed the slurry to the plurality of hydraulic fracturing pumps 16 shown in FIG. 1 through low-pressure suction hoses.

In the example embodiment shown, each of the plurality hydraulic fracturing units 12 includes an internal combustion engine 18. Each of the internal combustion engines 18 supplies power via a transmission 20 for each of the hydraulic fracturing units 12 to operate a hydraulic fracturing pump 16. The hydraulic fracturing pumps 16 are driven by the internal combustion engines 18 of the respective hydraulic fracturing units 12 and discharge the slurry (e.g., the fracturing fluid including the water, agents, gels, and/or proppants) at high pressure and/or a high flow rates through individual high-pressure discharge lines 24 into two or more high-pressure flow lines 26, sometimes referred to as "missiles," on the frac manifold 22. The flow from the flow lines 26 is combined at the frac manifold 22, and one or more of the flow lines 26 provide flow communication with a manifold assembly, sometimes referred to as a "goat head." The manifold assembly delivers the slurry into a wellhead manifold, sometimes referred to as a "zipper manifold" or a "frac manifold." The wellhead manifold may be configured to selectively divert the slurry to, for example, one or more well heads via operation of one or more valves. Once the fracturing process is ceased or completed, flow returning from the fractured formation discharges into a flowback manifold, and the returned flow may be collected in one or more flowback tanks.

In the embodiment shown in FIG. 1, one or more of the components of the hydraulic fracturing system 10 may be configured to be portable, so that the hydraulic fracturing system 10 may be transported to a well site, assembled, operated for a relatively short period of time, at least partially disassembled, and transported to another location of another well site for use. In the example shown in FIG. 1, each of the hydraulic fracturing pumps 16 and internal combustion engines 18 of a respective hydraulic fracturing unit 12 may be connected to (e.g., mounted on) a platform 28. In some embodiments, the platform 28 may be, or include, a trailer (e.g., a flat-bed trailer) and/or a truck body to which the components of a respective hydraulic fracturing unit 12 may be connected. For example, the components may be carried by trailers and/or incorporated into trucks, so that they may be more easily transported between well sites.

As shown in FIG. 1, the hydraulic fracturing system 10 includes an example system for supplying fuel 30, an example system for enabling communications 32, and an example system for conveying electric power 34 associated with operation of the hydraulic fracturing units 12 according to an embodiment of the disclosure. The example systems 30, 32, and/or 34 shown in FIG. 1 may sometimes be referred to as a "daisy-chain" arrangement. Other arrangements are contemplated, such as "hub-and-spoke," combination "daisy-chain" and "hub-and-spoke," and modifications thereof.

In the embodiment shown in FIG. 1, the system for supplying fuel 30 includes a main fuel line 36 configured to supply fuel from a fuel source 38 to the plurality of hydraulic fracturing units 12. The hydraulic fracturing units 12 are arranged into a first bank 40 of hydraulic fracturing units 12 and a second bank 42 of hydraulic fracturing units 12, and the main fuel line 36 includes a first main fuel line 36a configured to supply fuel to the first bank 40 of hydraulic fracturing units 12 and a second main fuel line 36b configured to supply fuel to the second bank 42 of the hydraulic fracturing units 12.

In the embodiment shown in FIG. 1, a manifold line 44 defines a flow path for supplying fuel to each of the internal combustion engines 18 of a respective hydraulic fracturing unit 12. In the example arrangement shown, a first one of the manifold lines 44 may be positioned to provide fluid flow between the main fuel line 36 and a first one of the internal combustion engines 18 in each of the first and second banks 40 and 42 of the hydraulic fracturing units 12, while the manifold lines 44 between the remaining hydraulic fracturing units 12 of each of the first and second banks 40 and 42 provides fluid flow between an upstream hydraulic fracturing unit 12 and a downstream hydraulic fracturing unit 12. The manifold lines 44 may each provide fluid flow to a respective internal combustion engine 18 of each of the hydraulic fracturing units 12, for example, via a fuel line providing fluid flow from each of the manifold lines 44. As shown in FIG. 1, in some embodiments, fuel that reaches the end of the first bank 40 of the hydraulic fracturing units 12 remote from the fuel source 38 and/or fuel that reaches the end of the second bank 42 of the hydraulic fracturing units 12 remote from the fuel source 38 may be combined and/or transferred between the first bank 40 and the second bank 42, for example, via a transfer line 46 configured to provide fluid flow between the first bank 40 and the second bank 42. For example, unused fuel supplied to either of the first bank 40 or the second bank 42 of hydraulic fracturing units 12 may be passed to the other bank of the two banks via the transfer line 46, thereby sharing fuel between the first and second banks 40 and 42.

As shown in FIG. 1, a communications cable assembly 48 including a length of communications cable 50 may be connected to each of the hydraulic fracturing units 12 and configured to enable data communications between the respective hydraulic fracturing unit 12 and a data center 52 located at a position remote from the hydraulic fracturing units 12 or one or more additional hydraulic fracturing units 12. For example, as shown FIG. 1, a data center communications cable 54 may provide a communications link between the data center 52 and a first one of the hydraulic fracturing units 12 of each of the first and second banks 40 and 42. The hydraulic fracturing unit 12 may include a length of communications cable 50 that extends to a next one of the hydraulic fracturing units 12 in each of the first and second banks 40 and 42, and that hydraulic fracturing unit 12 may include a length of communications cable 50 that extends to a next one of the hydraulic fracturing units 12. In some embodiments, each of the hydraulic fracturing units 12 may include a length of communications cable 50 for extending to a next one of the hydraulic fracturing units 12. In this example fashion, each of the hydraulic fracturing units 12 may be linked to one another and to the data center 52. As shown in FIG. 1, in some embodiments, a last-in-line hydraulic fracturing unit 12 of each of the first and second banks 40 and 42 may include a length of communications cable 50 that runs to the data center 52, thus resulting in a continuous communications link, by which one or more of the hydraulic fracturing units 12 may be in communication with the data center 52. In some embodiments, the data center 52 may be configured to transmit communications signals and/or receive communications signals, and the communications signals may include data indicative of operation of one or more of the plurality of hydraulic fracturing units 12, including, for example, parameters associated with operation of the hydraulic fracturing pumps 16 and/or the internal combustion engines 18, as well as additional data related to other parameters associated with operation and/or testing of one or more of the hydraulic fracturing units 12.

Figure 7:
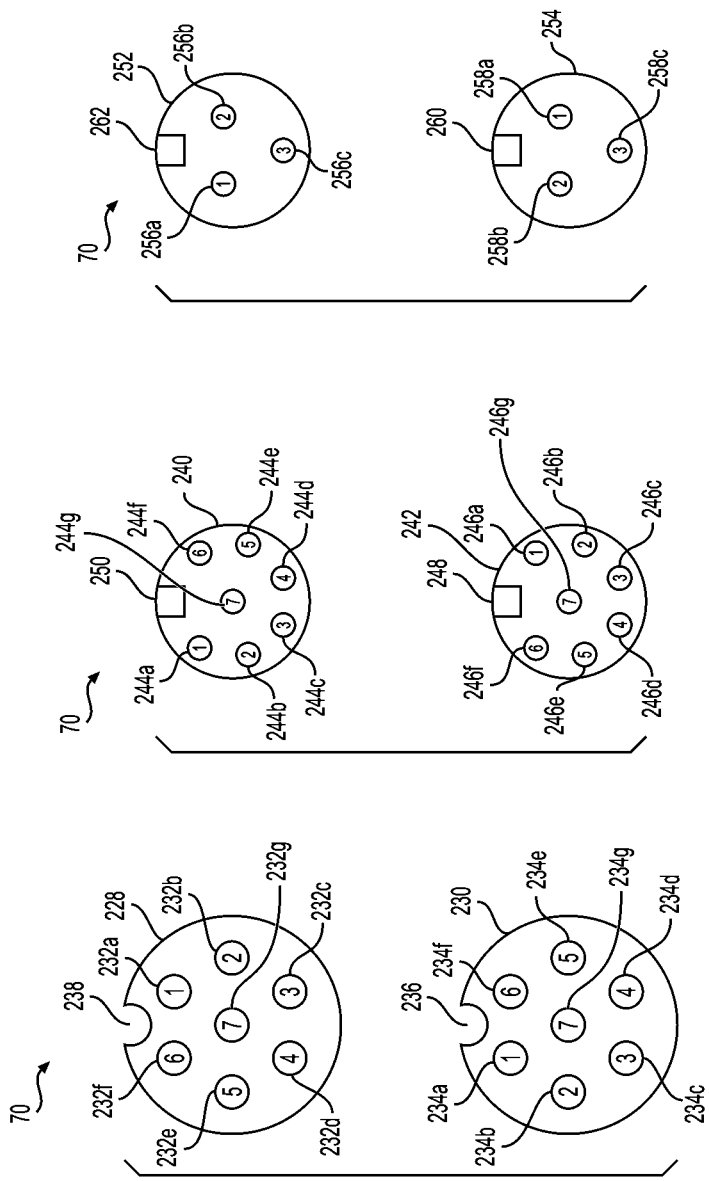
FIG. 7A is a schematic diagram of a male and female pair of an example quick-connect electrical coupler according to an embodiment of the disclosure.
FIG. 7B is a schematic diagram of a male and female pair of another example quick-connect electrical coupler according to an embodiment of the disclosure.
FIG. 7C is a schematic diagram of a male and female pair of another example quick-connect electrical coupler according to an embodiment of the disclosure.

In some embodiments, the communications cable 50 may include a first end configured to be connected to a first unit interface connected to a respective hydraulic fracturing unit 12. The length of communications cable 50 may also include a second end configured to be connected to a data center interface of the data center 52 or a second unit interface connected to another one of the hydraulic fracturing units 12. One or more of the first end or the second end of the length of communications cable 50 may include or be provided with a quick-connect electrical coupler configured to be connected to one or more of the first unit interface or the data center interface, for example, as discussed herein with respect to FIGS. 7A-7C.

As shown in FIG. 1, a power cable assembly 56 including a length of power cable 58 may be connected to one or more (e.g., each) of the hydraulic fracturing units 12 and configured to convey electric power between the hydraulic fracturing units 12 and a remote electrical power source 60 or one or more additional hydraulic fracturing units 12 of the hydraulic fracturing system 10. The electrical power source 60 may be located remotely, such that the electrical power source 60 is not mechanically connected directly to the platform 28 of one or more of the hydraulic fracturing units 12. In some embodiments, the electrical power source 60 may include one or more of one or more power generation devices and/or one or more batteries. For example, the electrical power source 60 may include one or more gensets (e.g., including an internal combustion engine-driven electrical generator) and/or one or more electric power storage devices, such as, for example, one or more batteries.

As shown in FIG. 1, a length of power cable 58 may be connected to each of the hydraulic fracturing units 12, and each of the lengths of power cable 58 may be configured to be connected to a next-in-line hydraulic fracturing unit 12 of each of the first and second banks 40 and 42 of the hydraulic fracturing units 12. In some embodiments, the length of power cable 58 may extend from one hydraulic fracturing unit 12 to another hydraulic fracturing unit 12 other than a next-in-line hydraulic fracturing unit 12. One or more of the lengths of power cable 58 may include a first end including a quick-connect electrical coupler, such as a power plug configured to be received in a power receptacle, for example, as discussed herein with respect to FIGS. 7A-7C.

As shown in FIG. 1, each of the hydraulic fracturing units 12 in the embodiment shown includes a length of power cable 58. In some such examples, each of the hydraulic fracturing units 12 may supply and/or generate its own electric power, for example, by operation of a generator connected to the internal combustion engine 18 and/or to another source of mechanical power, such as another gas turbine engine or reciprocating-piston engine (e.g., a diesel engine). In the example configuration shown in FIG. 1, the lengths of power cable 58 run between each of the hydraulic fracturing units 12, thus connecting all the hydraulic fracturing units 12 to one another, such that power may be shared among at least some or all of the hydraulic fracturing units 12. Thus, if one or more of the hydraulic fracturing units 12 is unable to generate its own electric power or is unable to generate a sufficient amount of electric power to meet its operation requirements, electric power from one or more of the remaining hydraulic fracturing units 12 may be used to mitigate or overcome the electric power deficit. As shown, additional lengths of power cable 58 may be included in the system for conveying electric power 34 to supply electric power between the first and second two banks 40 and 42 of the hydraulic fracturing units 12.

As shown in FIG. 1, the electrical power source 60 may be electrically coupled to one or more of the first bank 40 or the second bank 42 of the hydraulic fracturing units 12 via an additional length of power cable 62, and in some embodiments, the first bank 40 and the second bank 42 of hydraulic fracturing units 12 may be electrically coupled to one another via additional lengths of power cable 62. In at least some such examples, even if one or more of the hydraulic fracturing units 12 lacks electric power, electric power may be supplied to that particular hydraulic fracturing unit 12 via power cables 58 and/or 62, thereby providing an ability to continue operations of the hydraulic fracturing units 12.

As shown in FIG. 1, the example hydraulic fracturing system 10 includes hydraulic fracturing units 12 including example fracturing component sections 14 according to embodiments of the disclosure. In some embodiments, the fracturing component sections 14 may facilitate quickly exchanging a first fracturing component of a hydraulic fracturing unit 12 for another fracturing component of the same or similar type as the as the first fracturing component. For example, this may facilitate quickly exchanging a fracturing component in need of repair or replacement for another fracturing component of the same or similar type, for example, for exchanging a hydraulic fracturing pump 16, an internal combustion engine 18, and/or a transmission 20, for another respective replacement hydraulic fracturing pump, internal combustion engine, and/or transmission. Other component types are contemplated. In some embodiments, the fracturing component section 14 may include auxiliary systems used to operate the fracturing component of the respective fracturing component section 14, such as, electrical systems, hydraulic systems, pneumatic systems, and/or fluid systems, such as lubrication systems, cooling systems, and/or fuel system components. For example, for a fracturing component section 14 including a hydraulic fracturing pump 16, at least a portion of the electrical systems, hydraulic systems, pneumatic systems, and/or fluid systems, such as lubrication systems, and/or cooling systems necessary to control and/or monitor operation of the hydraulic fracturing pump 16 may be included as part of the corresponding fracturing component section 14. This may render it more efficient and/or reduce the time required for removing the affected fracturing component if it becomes necessary, for example, to service or replace the fracturing component.

In the embodiments shown in FIG. 1, one or more of the hydraulic fracturing units 12 may include one or more fracturing component sections 14, including a first fracturing component section 14a including a hydraulic fracturing pump 16, a second fracturing component section 14b including an internal combustion engine 18, and a third fracturing component section 14c including a transmission 20. Fracturing component sections 14 including other fracturing unit components are contemplated.

In the embodiments shown in FIG. 1, the first, second, and third fracturing component sections 14a, 14b, and 14c, each include a section frame 64 including a base 66 for supporting the corresponding fracturing component (e.g., the hydraulic fracturing pump 16, the internal combustion engine 18, or the transmission 20) and one or more frame members 68 connected to and extending from the base 66 (see, e.g., FIGS. 2A, 2B, and 2C). The one or more fracturing components associated with the fracturing component section 14 may be connected to the base 66. As mentioned above, one or more of the fracturing component sections 14 may include a component electrical assembly connected to the section frame 64 and positioned to provide one or more of electrical power, electrical controls, or electrical monitoring components associated with operation of the fracturing component included on the fracturing component section 14, depending on, for example, the type of fracturing component included the fracturing component section. In some embodiments, the fracturing component sections 14 may also include a component fluid assembly connected to the section frame 64 and positioned to provide one or more of lubrication, cooling, hydraulic function, or fuel to operate the included fracturing component, depending on, for example, the type of fracturing component included the fracturing component section 14.

As shown in FIG. 1, one or more of the fracturing component sections 14a, 14b, or 14c may include a plurality of quick-connect electrical couplers 70, individually identified in FIG. 1 as 70a, 70b, and 70c, and/or a plurality of quick-connect fluid couplers 72, individually identified in FIG. 1 as 72a, 72b, and 72c. As explained in more detail herein with respect to FIG. 4, the quick-connect electrical couplers 70 and/or the quick-connect fluid couplers 72 may be connected to one or more coupling plates 74 (FIG. 4) to provide a convenient location on the respective fracturing component section 14 for connecting and disconnecting electrical cables and/or fluid lines of the hydraulic fracturing unit 12 or hydraulic fracturing system 10. For example, the quick-connect electrical couplers 70 and/or a coupling plate 74 to which the quick-connect electrical couplers 70 are connected may be positioned to receive respective electrical connections of the component electrical assembly and electrically connect to other portions of the hydraulic fracturing unit 12 and/or other parts of the hydraulic fracturing system 10. In some embodiments, the quick-connect fluid couplers 72 and/or a coupling plate 74 to which the quick-connect fluid couplers 72 are connected may be positioned to receive respective fluid connections of the component fluid assembly and to provide fluid flow to other portions of the hydraulic fracturing unit 12 and/or other parts of the hydraulic fracturing system 10.

FIGS. 2A, 2B, and 2C are perspective views of an example fracturing component section 14 according to an embodiment of the disclosure. In the example shown, the fracturing component section 14 includes an example hydraulic fracturing pump 16. As shown in FIGS. 2A, 2B, and 2C, the fracturing component section 14 may include a section frame 64 including a base 66 for supporting the hydraulic fracturing pump 16 and one or more frame members 68 (e.g., uprights) connected to and extending from the base 66. For example, as shown, the base 66 includes two pairs of opposing guide rails 76 forming a rectangular support for supporting the hydraulic fracturing pump 16. In some embodiments, the base 66 may include one or more transverse members 78 extending between at least one pair of the opposing guide rails 76. One or more of the opposing guide rails 76 may be sized and/or configured to assist with alignment of the section frame 64 (i.e., the fracturing component section 14) with respect to the platform 28 supporting the fracturing component section 14 and/or with alignment of the section frame 64 relative to one or more adjacent fracturing component sections 14. Some embodiments of the opposing guide rails 76 may be formed from I-beams and/or C-channels. As shown, some of the guide rails 76 may include one or more recesses 80 (e.g., apertures) configured to receive a fork of a fork truck to facilitate separating the fracturing component section 14 from the platform 28 and/or the remainder of the hydraulic fracturing unit 12. In some embodiments, the recesses 80 may be located in guide rails 76 accessible from the side of the platform 28. In some embodiments, the recesses 80 may be on all opposing guide rails 76.

As shown in FIGS. 2A, 2B, and 2C, some embodiments of the section frame 64 may include opposing pairs of cross-members 82 extending between distal ends of the frame members 68, for example, such that the section frame 64 generally forms a cubic frame or rectangular prism frame. In some embodiments, at one or more (e.g., each) of the corners formed by the frame members 68 and the cross-members 82, the section frame 64 may include a lifting eye 84 to facilitate separating the fracturing component section 14 from the platform 28 and/or the remainder of the hydraulic fracturing unit 12. In some embodiments of the section frame 64, reinforcement elements, such as gussets, to stiffen the section frame 64 may be provided at one or more of the corners formed by intersections of the base 66, the frame members 68, the transverse members 78, and/or the cross-members 82.

As shown in FIGS. 2A, 2B, and 2C, the example fracturing component section 14 includes an example hydraulic fracturing pump 16. The hydraulic fracturing pump 16 shown includes a power end 86, a fluid end 88, and a driveshaft 90 for connecting to an output of a transmission 20 or an output of an internal combustion engine 18, which may be the output of a reduction transmission connected to the output shaft the internal combustion engine 18. The transmission 20 and/or the internal combustion engine 18 may be mounted on a section frame 64 and be part of an adjacent fracturing component section 14 with respect to the fracturing component section 14 including a hydraulic fracturing pump 16.

The embodiment of fracturing component section 14 shown in FIGS. 2A, 2B, and 2C includes auxiliary components for facilitating operation, control, and/or monitoring of the operation of the hydraulic fracturing pump 16. Auxiliary components may include lubrication pumps, lubrication filters, a plunger packing greasing system, lubrication coolers, pulsation dampers, suction components, high-pressure discharge components, and instrumentation related to operation of the hydraulic fracturing pump 16. For example, the fracturing component section 14 shown in FIGS. 2A, 2B, and 2C includes lubrication coolers 92, a packing greater 94, lubrication pumps 96, a suction manifold for drawing-in fracturing fluid 98, and a discharge manifold 100 for discharging fracturing fluid at high pressure and high flow rates.

In some embodiments, the fracturing component section 14 may also include a component condition monitoring system 102 for monitoring parameters related to operation of the fracturing component section 14, as shown in FIGS. 2A, 2B, and 2C. As explained in more detail herein with respect to FIG. 8, the component condition monitoring system 102 may be configured to receive one or more signals from a plurality of sensors and/or a plurality of electrical instruments connected to the fracturing component section 14 and generate one or more condition signals indicative of operating parameters associated with operation of the fracturing component included in the fracturing component section 14 (e.g., a hydraulic fracturing pump 16, an internal combustion engine 18, and/or a transmission 20).

In some embodiments, the fracturing component section 14 may be connected to the platform 28 of the hydraulic fracturing unit 12 via fasteners and/or locks. For example, the section frame 64 (e.g., the base 66) may include a plurality of holes for receiving fasteners to secure the section frame 64 to the platform 28 to secure the fracturing component section 14 to the platform 28 and/or to at least partially support the fracturing component section 14. In some embodiments, the fracturing component section 14 may also, or alternatively, include a plurality of clamp locks positioned to secure the section frame 64 to the platform 28 to secure the fracturing component section 14 to the platform 28 to at least partially support the fracturing component section 14.

Although the example fracturing component section 14 shown in FIGS. 2A, 2B, and 2C includes a hydraulic fracturing pump 16 and related auxiliary components, fracturing component sections 14 including other types of fracturing components and their related auxiliary components are contemplated, such as prime movers for driving hydraulic fracturing pumps or electrical generators supplying electrical power to electric motors for driving featuring pumps (e.g., diesel engines and/or GTEs), and transmissions 20 and related auxiliary components. For example, a fracturing component section 14 may include a prime mover, such as a GTE, which may be a dual-fuel and/or dual-shaft GTE cantilever-mounted to a reduction gearbox, lubrication pumps, heat exchangers to cool lubrication, a prime mover communication module, and/or circuit sensors and instrumentation associated with the prime mover. In another example, a fracturing component section 14 may include a transmission including a multi-gear transmission, lubrication pumps, heat exchangers to cool lubrication, a transmission communication module, and/or circuit sensors and instrumentation associated with the transmission. Other types of the fracturing components for fracturing component sections are contemplated.

Figure 3A:
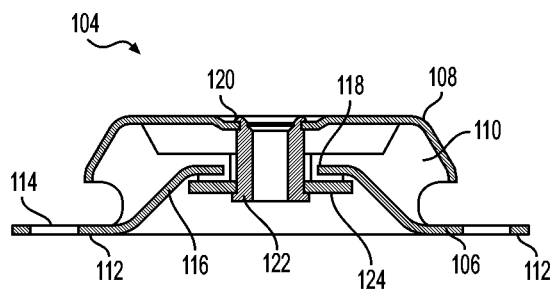
FIG. 3A is a side section view of an example shock mount for mounting a fracturing component to a section frame of a fracturing component section according to an embodiment of the disclosure.
Figure 3B:
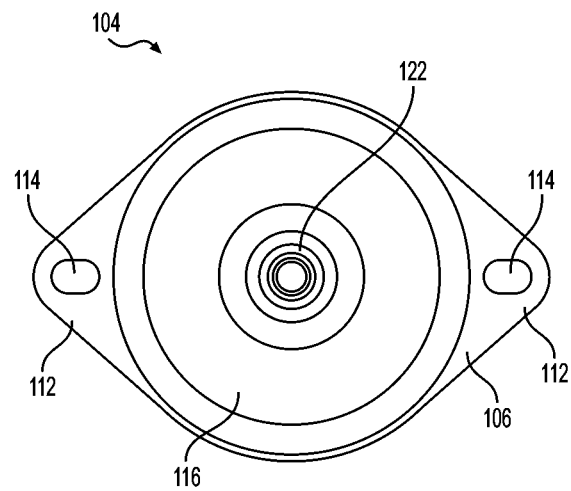
FIG. 3B is a top view of the example shock mount shown in FIG. 3A according to an embodiment of the disclosure.

FIGS. 3A and 3B are a side section view and a top view of an example shock mount 104 for mounting a fracturing component to a section frame 64 of a fracturing component section 14 according to an embodiment of the disclosure. The shock mount 104 may be configured to secure the fracturing component to the base 66 of the section frame 64 and absorb vibrations and shock generated during transportation and operation of the fracturing component.

For example, as shown in FIGS. 3A and 3B, the shock mount may include a base plate 106 configured to be connected to an upper surface of the base 66 of the section frame 64, an upper plate 108 configured to be connected to the fracturing component, and an absorbing portion 110 between the base plate 106 and the upper plate 108 and configured to absorb shock and vibration. The base plate 106 may include one or more securement flanges 112, each including one or more holes 114 through which bolts may be received to secure the shock mount 104 to the base 66 of the section frame 64. The base plate 106 may also include a circular embossment 116 including a fastener hole 118 configured to receive therein a fastener (e.g., a bolt) for securing the fracturing component to the shock mount 104. The upper plate 108 also includes a sleeve hole 120 in which a sleeve 122 is received and connected. The sleeve 122 extends from the sleeve hole 120 through the fastener hole 118 of the embossment 116 of the base plate 106. A circular flange 124 prevents the sleeve 122 from pulling out of the fastener hole 118, but permits the sleeve 122 to reciprocate within the fastener hole 118 as the absorbing portion 110 compresses and expands as load changes on the shock mount 104, thereby absorbing shock and vibration transmitted between the base 66 of the section frame 64 and the fracturing component mounted to the section frame 64.

FIG. 4 is a perspective view of a coupling plate 74 including a plurality of quick-connect fluid couplers 72 connected to the coupling plate 74 according to embodiments of the disclosure. In some embodiments, the coupling plate 72 may be connected to the section frame 64 at a location easily accessible to facilitate access to quick-connect electrical couplers 70 and/or quick-connect fluid couplers 72 connected to the coupling plate 74. For example, the coupling plate 74 may be mounted to the base 66, the frame members 68, and the cross-members 82 with the quick-connect electrical and/or fluid couplers 70 or 72 facing outward away from the fracturing component mounted to the base 66. In some embodiments, the fracturing component section 14 may include more than one coupling plate 74, such as one or more coupling plates 74 for quick-connect electrical couplers 70 and one or more coupling plates 74 for quick-connect fluid couplers 72. The one or more coupling plates 74 may facilitate ease of connecting and disconnecting electrical lines and/or fluid lines from other portions of the hydraulic fracturing unit 12 and/or other portions of the hydraulic fracturing system 10 with electrical lines and/or fluid lines of the fracturing component section 14.

FIG. 5A is a side section view of an example receptacle 126 of a quick-connect fluid coupler 72 for connecting to a coupling plate 74 according to an embodiment of the disclosure, and FIG. 5B is a side section view of an example plug 128 for connection to the quick-connect fluid coupler receptacle 126 shown in FIG. 5A according to an embodiment of the disclosure. The receptacle 126 may be connected to the coupler plate 74 and configured to receive and retain in a fluid-tight manner a fluid line from the fracturing component section 14 to which the coupling plate 74 is connected. The plug 128 may be configured to receive a fluid line from the hydraulic fracturing unit 12 to which the fracturing component section 14 is connected or a fluid line from the hydraulic fracturing system 10. The receptacle 126 and the plug 128 may be configured such that the plug 128 is easily inserted into, and easily separated from, the receptacle 126 for connecting a fluid line from the fracturing component section 14 to a fluid line of the hydraulic fracturing unit 12 or the hydraulic fracturing system 10. In some embodiments, the receptacle 126 and/or the plug 128 are configured, such that when a plug 128 received in the receptacle 126 is removed to disconnect the fluid lines, fluid does not leak from the receptacle 126 and/or the plug 128.

As shown in FIG. 5A, the receptacle 126 includes a hollow cylindrical socket body 130 receiving therein a valve guide 132 and a valve 134. The valve 134 includes an O-ring 136 for sealing the valve 134 against a conical interior surface of the socket body 130. The socket body 130 also includes a cylindrical interior surface 138 including an annular recess receiving an O-ring 140. The receptacle 126 includes a fluid line connection end 142 having interior threads for connecting to a fluid line of the fracturing component section 14. On an exterior surface of the socket body 130, a spring-loaded sleeve 144 including a spring 146 is provided. The plug 128 includes a plug body 148 defining a cylindrical interior surface 150 receiving therein a valve guide 152, a valve 154, and a spring 156 between the valve guide 152 and the valve 154. The plug body 148 includes a fluid line connection end 158 having interior threads for connecting to a fluid line of the hydraulic fracturing unit 12 or the hydraulic fracturing system 10. The plug body 148 has an exterior surface 160 including an annular recess 162. When connecting a fluid line from the hydraulic fracturing unit 12 or the hydraulic fracturing system 10, the sleeve 144 of the receptacle 126 is pushed back toward the fluid line connection end 142 exposing locking balls 164, and the plug 128 is inserted into the receptacle 126, such that the annular recess 162 of the plug 128 is captured by the locking balls 164 of the receptacle 126. The sleeve 144 is moved back into position away from the fluid line connection end 142 (e.g., via the spring 146) holding the locking balls 164 in the annular recess 162 of the plug 128, thereby holding the receptacle 126 and the plug 128 together. In this condition, the valve 134 of the plug 126 and the valve 154 unseat to thereby allow fluid to flow between the plug 128 and the receptacle 126. When the plug 128 is disconnected from the receptacle 126, the sleeve 144 is pushed back to allow the locking balls 164 to release the annular recess 162 of the plug 128 to be separated from the locking balls 164. In this condition, the valves 134 and 154 return to their respective seats, acting as check valves such that fluid in the fluid line of the fracturing component section 14 connected to the receptacle 126 is not leaked from the receptacle 126, and such that fluid from the fluid line connected to the plug 128 is not leaked from the plug 128. Other types and configurations of quick-connect fluid couplers 72 are contemplated.

Figure 6:
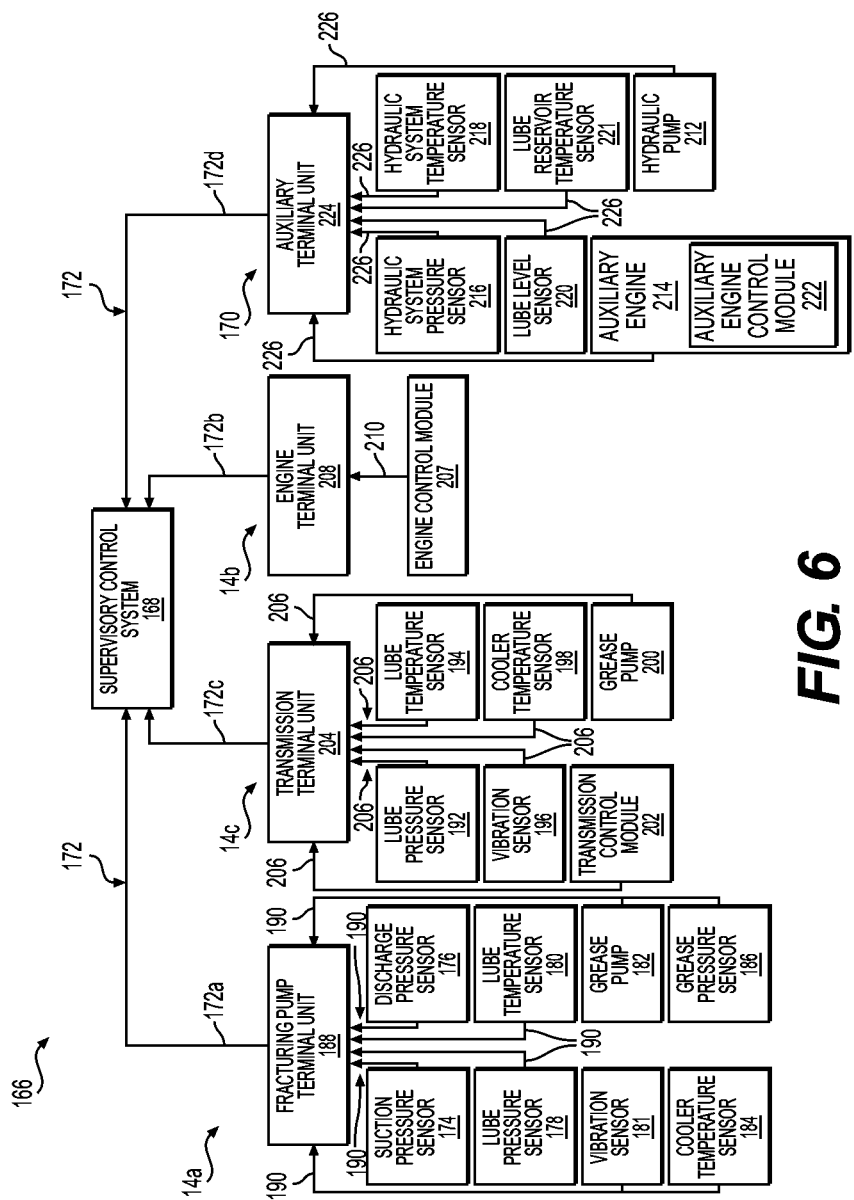
FIG. 6 is a schematic diagram of an example electrical control system for a plurality of example fracturing component sections, including an example supervisory control system according to an embodiment of the disclosure.

FIG. 6 is a schematic diagram of an embodiment of an electrical control system 166 for a plurality of example fracturing component sections 14, including an example supervisory control system 168 according to an embodiment of the disclosure. As shown in FIG. 6, the hydraulic fracturing unit 12 includes a fracturing component section 14a for a hydraulic fracturing pump 16, a fracturing component section 14b for an internal combustion engine 18, such as a diesel engine or a GTE, a fracturing component section 14c for a transmission 20, and an auxiliary system 170 for suppling electrical power and hydraulic power and/or operations for the hydraulic fracturing unit 12. In some embodiments, for example as shown, for each of the fracturing component section 14a, the fracturing component section 14b, the fracturing component section 14c, and the auxiliary system 170 of the hydraulic fracturing unit 12, all of the electrical instrumentation and electrical control may be connected and in communication with the supervisory control system 168 via a respective single sub-system communications cable 172, identified respectively as 172a, 172b, 172c, and 172d. Thus, when separating one or more of the fracturing component sections 14a, 14b, and/or 14c from the hydraulic fracturing unit 12, only a single sub-system communications cable 172 may be disconnected from the fracturing component section 14 being separated, as explained in more detail herein.

As shown in FIG. 6, the fracturing component section 14a including the hydraulic fracturing pump 16 includes a plurality of sensors configured to generate signals indicative of parameters associated with operation of the hydraulic fracturing pump 16. For example, the sensors may include a suction pressure sensor 174 configured to generate signals indicative of the pressure associated with the hydraulic fracturing pump 16 drawing fracturing fluid into the hydraulic fracturing pump 16, a discharge pressure sensor 176 configure to generate one or more signals indicative of the pressure at which fracturing fluid is being discharged from the hydraulic fracturing pump 16, a lubrication pressure sensor 178 configured to generate one or more signals indicative of the pressure of lubricant in a lubrication system associated with the hydraulic fracturing pump 16, a lubrication temperature sensor 180 configured to generate one or more signals indicative of the temperature of the lubricant, a vibration sensor 181 configured to generate signals indicative of a frequency and/or magnitude of vibration associated with operation of the hydraulic fracturing pump 16, a grease pump sensor 182 configured to generate one or more signals indicative of operation of a grease pump configured to supply lubricant to the hydraulic fracturing pump 16, a cooler temperature sensor 184 configured to generate one or more signals indicative of the temperature of coolant of a coolant system associated with the hydraulic fracturing pump 16, and/or a grease pressure sensor 186 configured to generate one or more signals indicative of the pressure of grease pumped by the grease pump. Other sensor types are contemplated.

As shown in FIG. 6, in some embodiments, each of the sensors may be in communication with a fracturing pump terminal unit 188 via a single sensor communications cable 190, which, in turn, may be in communication with the supervisory control system 168 via a single sub-systems communication cable 172a. The supervisory control system 168, in some embodiments, may be in communication with the data center 52 via the communications cable 50 and/or the data center communications cable 54 (see FIG. 1). For example, each of the sensors may be connected to respective terminations in the fracturing pump terminal unit 188, which is connected to the fracturing component section 14a of the hydraulic fracturing pump 16 (e.g., to the section frame 64, for example, as shown in FIGS. 2A, 2B, and 2C). For example, each of the single sensor communications cables 190 may pass through a respective punch-out of the fracturing pump terminal unit 188 and be connected to terminations in the enclosed interior of the fracturing pump terminal unit 188, for example, via individual pin connectors (e.g., quarter-turn pin connectors). Those connections may be connected to a terminal rail inside the enclosed interior, and each of the connections to the terminal rail may be connected to a single quick connect electrical coupler 70, such as a female multi-pin plug (see, e.g., FIGS. 7A, 7B, and 7C). The single female multi-pin plug may be coupled to the supervisory control system 166 of the fracturing component section 14a via the single sub-system communications cable 172a.

Thus, in some embodiments, when the fracturing component section 14a of the hydraulic fracturing pump 16 is separated from the hydraulic fracturing unit 12, only a single sub-system communications cable 172a may be disconnected from the fracturing pump terminal unit 188 to disconnect the electrical components of the fracturing component section 14a from the supervisory control system 168 of the hydraulic fracturing unit 12. This may result in reducing the time and complexity associated with separating the fracturing component section 14a from the remainder of the hydraulic fracturing unit 12.

In some embodiments, as shown in FIG. 6, the fracturing component section 14c including the transmission 20 includes a plurality of sensors configured to generate signals indicative of parameters associated with operation of the transmission 18. For example, the sensors may include a lubrication pressure sensor 192 configured to generate one or more signals indicative of the pressure of a lubricant in a lubrication system associated with the transmission 20, a lubrication temperature sensor 194 configured to generate one or more signals indicative of the temperature of the lubricant associated with the transmission 20, a vibration sensor 196 configured to generate signals indicative of a frequency and/or magnitude of vibration associated with operation of the transmission 20, a cooler temperature sensor 198 configured to generate one or more signals indicative of the temperature of a coolant of a coolant system associated with the transmission 20, and/or a grease pump sensor 200 configured to generate one or more signals indicative of operation of a grease pump configured to supply lubricant to the transmission 20. Other sensor types are contemplated. In addition, the fracturing component section 14c associated with the transmission 20 may also include a transmission control module 202 configured to control operation of the transmission 20 and generate one or more signals indicative of operation of the transmission 20.

As shown in FIG. 6, in some embodiments, each of the sensors may be in communication with a transmission terminal unit 204 via a single transmission communications cable 206, which, in turn, may be in communication with the supervisory control system 168 via a single sub-systems communication cable 172b. For example, each of the sensors associated with the transmission 192 through 200 and the transmission control module 202 may be connected to respective terminations in the transmission terminal unit 204, which is connected to the fracturing component section 14c of the transmission 20 (e.g., to the section frame 64 in a manner similar to the manner shown in FIGS. 2A, 2B, and 2C). For example, each of the single sensor communications cables 206 may pass through a respective punch-out of the transmission terminal unit 204 and be connected to terminations in the enclosed interior of the transmission terminal unit 204, for example, via individual pin connectors (e.g., quarter-turn pin connectors). Those connections may be connected to a terminal rail inside the enclosed interior, and each of the connections to the terminal rail may be connected to a single quick connect electrical coupler 70, such as a female multi-pin plug (see, e.g., FIGS. 7A, 7B, and 7C). The single female multi-pin plug may be coupled to the supervisory control system 166 of the fracturing component section 14b via the single sub-system communications cable 172c.

Thus, in some embodiments, when the fracturing component section 14b of the transmission 20 is separated from the hydraulic fracturing unit 12, only a single sub-system communications cable 172c may be disconnected from the transmission terminal unit 204 to disconnect the electrical components of the fracturing component section 14c from the supervisory control system 168 of the hydraulic fracturing unit 12. This may result in reducing the time and complexity associated with separating the fracturing component section 14c from the remainder of the hydraulic fracturing unit 12.

In some embodiments, as shown in FIG. 6, the fracturing component section 14b including the internal combustion engine 18 includes a plurality of sensors configured to generate signals indicative of parameters associated with operation of the internal combustion engine 18. In some embodiments, the sensors may be incorporated into an engine control module 207. For example, the sensors may include a lubrication pressure sensor configured to generate one or more signals indicative of the pressure of a lubricant in a lubrication system associated with the internal engine 18, a lubrication temperature sensor configured to generate one or more signals indicative of the temperature of the lubricant associated with the internal combustion engine 18, a vibration sensor configured to generate signals indicative of a frequency and/or magnitude of vibration associated with operation of the internal combustion engine 18, and/or a cooler temperature sensor configured to generate one or more signals indicative of the temperature of a coolant of a coolant system associated with the internal combustion engine 18. Other sensor types are contemplated.

As shown in FIG. 6, in some embodiments, the engine control module 207 may be in communication with an engine terminal unit 208 via a single communications cable 210, which, in turn, may be in communication with the supervisory control system 168 via a single sub-systems communication cable 172b. For example, the engine control module 207 may be connected to a terminal in the engine terminal unit 208, which is connected to the fracturing component section 14b of the internal combustion engine 18 (e.g., to the section frame 64 in a manner similar to the manner shown in FIGS. 2A, 2B, and 2C). For example, communications cable 210 may pass through a punch-out of the engine terminal unit 208 and be connected to a terminal in the enclosed interior of the engine terminal unit 208, for example, via a pin connector (e.g., quarter-turn pin connector). That connection may be connected to a terminal rail inside the enclosed interior, and the connection to the terminal rail may be connected to a single quick connect electrical coupler 70, such as a female multi-pin plug (see, e.g., FIGS. 7A, 7B, and 7C). The single female multi-pin plug may be coupled to the supervisory control system 166 of the fracturing component section 14b via the single sub-system communications cable 172b.

Thus, in some embodiments, when the fracturing component section 14b of the internal combustion engine 18 is separated from the hydraulic fracturing unit 12, only a single sub-system communications cable 172b may be disconnected from the engine terminal unit 208 to disconnect the electrical components of the fracturing component section 14b from the supervisory control system 168 of the hydraulic fracturing unit 12. This may result in reducing the time and complexity associated with separating the fracturing component section 14b from the remainder of the hydraulic fracturing unit 12.

In some embodiments, as shown in FIG. 6, the auxiliary system 170 of the hydraulic fracturing unit 12 may include a hydraulic system including one or more hydraulic pumps 212 connected to the hydraulic fracturing unit 12 and associated hydraulic circuit components for operation of the hydraulic fracturing unit 12. In some embodiments, the auxiliary system 170 may also include an auxiliary engine 214 connected to the hydraulic fracturing unit 12 and configured to supply power for operation of the hydraulic system and/or operation of an electrical system of the hydraulic fracturing unit 12. For example, the auxiliary engine 214 may drive the one or more hydraulic pumps 212 and/or an electrical power generation device.

In some embodiments, the auxiliary system 170 may include a plurality of sensors configured to generate signals indicative of parameters associated with operation of the auxiliary system 170. For example, the sensors may include a hydraulic system pressure sensor 216 configured to generate one or more signals indicative of the pressure of hydraulic fluid of the hydraulic system, a hydraulic system temperature sensor 218 configured to generate one or more signals indicative of the temperature of the hydraulic fluid, a lubrication level sensor 220 configured to generate one or more signals indicative of a lubrication level of a lubrication system associated with the auxiliary system 170, and a lubrication reservoir temperature sensor 221 configured to generate one or more signals indicative of the temperature of lubricant in the lubricant reservoir. Other sensor types are contemplated.

In some embodiments, the auxiliary system 170 may also include a plurality of sensors configured to generate signals indicative of parameters associated with operation of the auxiliary engine 214. In some embodiments, the sensors may be incorporated into an auxiliary engine control module 222. For example, the sensors may include one or more of a lubrication pressure sensor configured to generate one or more signals indicative of the pressure of a lubricant in a lubrication system associated with the auxiliary engine 214, a lubrication temperature sensor configured to generate one or more signals indicative of the temperature of the lubricant associated with the auxiliary engine 214, a vibration sensor configured to generate signals indicative of a frequency and/or magnitude of vibration associated with operation of the auxiliary engine 214, and a cooler temperature sensor configured to generate one or more signals indicative of the temperature of a coolant of a coolant system associated with the auxiliary engine 214. Other sensor types associated with the auxiliary engine 214 are contemplated. In some embodiments, the auxiliary system 170 may also include one or more hydraulic pump sensors configured to generate one or more signals indicative of operation of the one or more hydraulic pumps 212.

As shown in FIG. 6, in some embodiments, each of the sensors associated with the auxiliary system 170 may be in communication with an auxiliary terminal unit 224 via a single auxiliary communications cable 226, which, in turn, may be in communication with the supervisory control system 168 via a single sub-systems communication cable 172d. The auxiliary engine control module 222 and the hydraulic pump(s) 212 may be connected to the supervisory control system 168 via sub-systems communications cables 226. For example, each of the sensors associated with the auxiliary system 170, the auxiliary engine control module 222, and the hydraulic pump(s) 212 may be connected to respective terminations in the auxiliary terminal unit 224, which is connected to the hydraulic fracturing unit 12 (e.g., to the platform 28). For example, each of the sensor communications cables 226 may pass through a respective punch-out of the auxiliary terminal unit 224 and be connected to terminations in the enclosed interior of the auxiliary terminal unit 224, for example, via individual pin connectors (e.g., quarter-turn pin connectors). Those connections may be connected to a terminal rail inside the enclosed interior, and each of the connections to the terminal rail may be connected to a single quick connect electrical coupler 70, such as a female multi-pin plug (see, e.g., FIGS. 7A, 7B, and 7C). The single female multi-pin plug may be coupled to the supervisory control system 168 of the hydraulic fracturing unit 12 via the single sub-system communications cable 172d.

FIGS. 7A, 7B, and 7C are schematic diagrams of male and female pairs of an example quick-connect electrical couplers 70 according to embodiments of the disclosure. As shown in FIG. 7A, the quick-connect electrical couplers 70 may include a female plug 228 and a cooperating male plug 230 configured to engage the female plug 228 to electrically connect an electrical cable connected to the female plug 228 with an electrical cable connected to the male plug 230, for example, one or more of the electrical cables from the sensors and/or components of the electrical system 166 to a terminal unit of a corresponding fracturing component section 14 and/or the auxiliary system 170 (e.g., the terminal units 188, 204, 208, and/or 224 shown in FIG. 6). In some embodiments, the female plug 228 may be electrically connected to a cable connecting the female plug 228 to the terminal rail in the interior of an associated terminal unit, and the male plug 230 may be connected to one of the sub-system communications cables 172 between the terminal unit and the supervisory control system 168. In some examples, the male plug 230 may be engaged with the female plug 228 to electrically connect the associated terminal unit to the supervisory control system 168.

In the example shown in FIG. 7A, the female plug 228 of the example quick-connect electrical coupler 70 may include seven pins 232, identified as 232a, 232b, 232c, 232d, 232e, 232f, and 232g, and the male plug 230 may include seven pins 234, identified as 234a, 234b, 234c, 234d, 234e, 234f, and 234g configured to be electrically coupled to the seven pins 232 of the female plug 228. The embodiment shown also includes an alignment portion 236 in the male plug 230 and an alignment portion 238 in the female plug 228 configured to ensure that the male plug 230 and the female plug 228 are engaged with the pins 232 and 234 correctly connected, for example, so that pin 232a and pin 234a engage one another, pin 232b and pin 234b engage one another, pin 232c and pin 234c engage one another, pin 232d and pin 234d engage one another, pin 232e and pin 234e engage one another, pin 232f and pin 234f engage one another, and pin 232g and pin 234g engage one another. In the embodiment shown in FIG. 7A, the alignment portions 236 and 238 are recesses having a semi-circular cross-section. Other configurations and/or cross-sections are contemplated, for example, as shown in FIG. 7B.

As shown in FIG. 7B, the example quick-connect electrical couplers 70 may include a female plug 240 and a cooperating male plug 242 configured to engage the female plug 240 to electrically connect an electrical cable connected to the female plug 240 with an electrical cable connected to the male plug 242, such as one or more of the electrical cables from the sensors and/or components of the electrical system 166 (FIG. 6) to a terminal unit of a corresponding fracturing component section 14 and/or the auxiliary system 170 (e.g., the terminal units 188, 204, 208, and/or 224 shown in FIG. 6). In some embodiments, the female plug 240 may be electrically connected to a cable connecting the female plug 240 to the terminal rail in the interior of an associated terminal unit, and the male plug 242 may be connected to one of the sub-system communications cables 172 between the terminal unit and the supervisory control system 168. The male plug 242 may be engaged with the female plug 240 to electrically connect the associated terminal unit to the supervisory control system 168.

In the example shown in FIG. 7B, the female plug 240 of the example quick-connect electrical coupler 70 may include seven pins 244, identified as 244a, 244b, 244c, 244d, 244e, 244f, and 244g, and the male plug 242 may include seven pins 246, identified as 246a, 246b, 246c, 246d, 246e, 246f, and 246g configured to be electrically coupled to the seven pins 244 of the female plug 240. The example shown also includes an alignment portion 248 and an alignment portion 250 configured to ensure the male plug 242 and the female plug 240 are engaged with the pins 244 and 246 correctly connected, for example, so that pin 244a and pin 246a engage one another, pin 244b and pin 246b engage one another, pin 244c and pin 246c engage one another, pin 244d and pin 246d engage one another, pin 244e and pin 246e engage one another, pin 244f and pin 246f engage one another, and pin 244g and pin 246g engage one another. In the embodiment shown in FIG. 7B, the alignment portions 248 and 250 have a substantially square-shaped cross-section. Other configurations and/or cross-sections are contemplated, for example, as shown in FIG. 7A.

As shown in FIG. 7C, the quick-connect electrical couplers 70 may include a female plug 252 and a cooperating male plug 254 configured to engage the female plug 252 to electrically connect an electrical cable connected to the female plug 252 with an electrical cable connected to the male pug 254, for example, one or more of the electrical cables from the sensors and/or components of the electrical system 166 (FIG. 6) to a terminal unit of a corresponding fracturing component section 14 and/or the auxiliary system 170 (e.g., the terminal units 188, 204, 208, and/or 224 shown in FIG. 6). In some embodiments, the female plug 252 may be electrically connected to a cable connecting the female plug 252 to the terminal rail in the interior of an associated terminal unit, and the male plug 254 may be connected to one of the sub-system communications cables 172 between the terminal unit and the supervisory control system 168. The male plug 254 may be engaged with the female plug 252 to electrically connect the associated terminal unit to the supervisory control system 168.

In the example shown in FIG. 7C, the female plug 252 of the example quick-connect electrical coupler 70 may include three pins 256, identified as 256a, 256b, and 256c, and the male plug 254 may include three pins 258, identified as 258a, 258b, and 258c configured to be electrically coupled to the three pins 256 of the female plug 252. The example shown also includes an alignment portion 260 and an alignment portion 262 configured to ensure that the male plug 254 and the female plug 252 are correctly connected, for example, so that pin 256a and pin 258a engage one another, pin 256b and pin 258b engage one another, and pin 256c and pin 258c engage one another. In the example shown in FIG. 7C, the alignment portions 260 and 262 have a substantially square-shaped cross-section. Other configurations and/or cross-sections are contemplated, for example, as shown in FIG. 7A.

Figure 8:
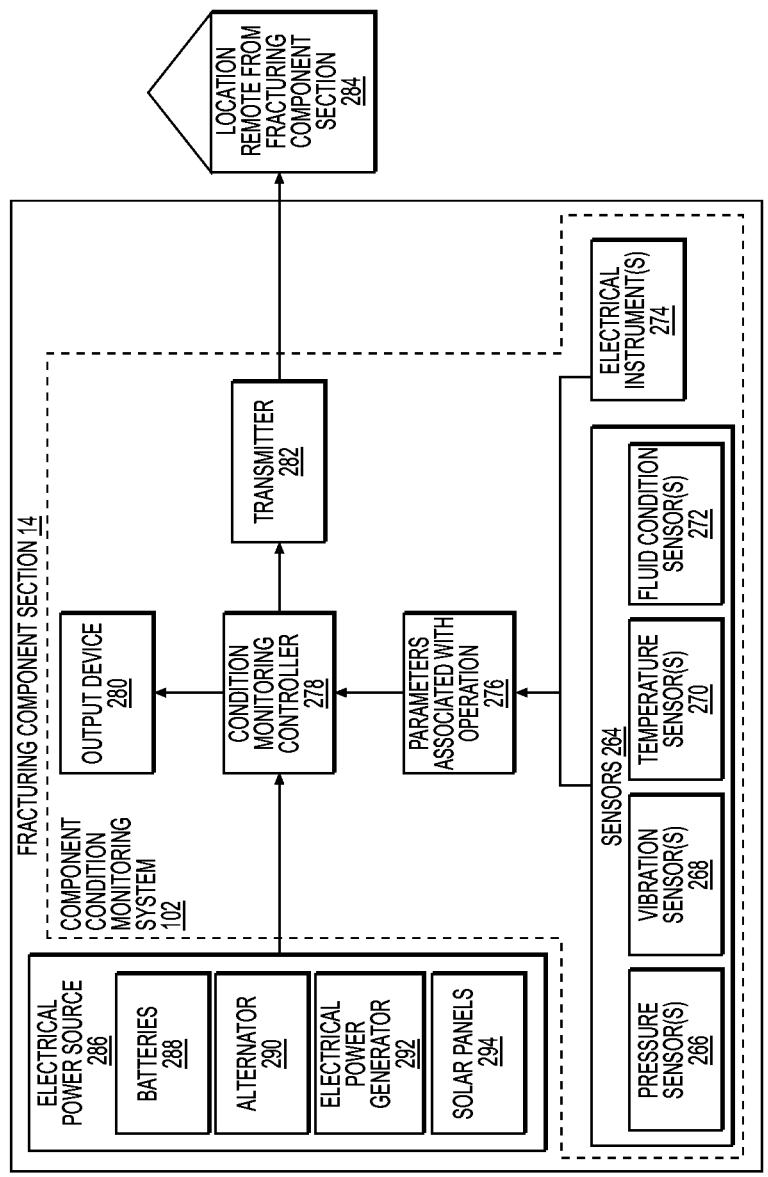
FIG. 8 is a schematic diagram of an example component condition monitoring system for a fracturing component section according to an embodiment of the disclosure.

FIG. 8 is a schematic diagram of a component condition monitoring system 102 for a fracturing component section 14 according to an embodiment of the disclosure. As noted with respect to FIGS. 2A, 2B, and 2C, the component condition monitoring system 102 may in some embodiments be connected one or more of the fracturing component sections 14 and/or the hydraulic fracturing unit 12, depending on, for example, the portion of the hydraulic fracturing unit 12 monitored by the component condition monitoring system 102. For example, a component condition monitoring system 102 may be connected the to the fracturing component section 14a of the hydraulic fracturing pump 16, the fracturing component section 14b of the internal combustion engine 18, the fracturing component section 14c of the transmission 20, and/or the auxiliary system 170. In some embodiments, the component condition monitoring system 102 may be configured to monitor and/or store information relating to the status one or more of the components and/or systems of a hydraulic fracturing unit 12 or, more specifically, one of the fracturing component sections 14 and/or the auxiliary system 170. Examples of conditions related to the fracturing components and/or auxiliary system 170 may include high continuous vibration, fluid contamination, overheating of lubrication systems and/or cooling systems, lack of grease packing pressure and packing failures, as well as iron failures and consumable failures associated with the fluid end 88 of the hydraulic fracturing pump 16 (FIGS. 2A, 2B, and 2C), such as valve failures and valve seat failures. The component condition monitoring system 102, in some embodiments, may monitor the fracturing component section 14 and/or auxiliary systems 170, factoring irregularities within sets of parameters that could be an indication of a failure, imminent failure, and/or condition indicating maintenance, repair, and/or replacement should be performed. In some instances, an operator of the hydraulic fracturing system 12 may be notified via an output device, such as a display including a graphical user interface. In some embodiments, the component condition monitoring system 102 may include a transmitter and/or receiver (e.g., a transceiver) configured to communicate an operational status to a location remote from the hydraulic fracturing unit 12 and/or remote from the hydraulic fracturing system 10, such as an off-site fracturing operation management facility and/or a service center.

In the embodiment shown in FIG. 8, the component condition monitoring system 102 may include a plurality of sensors 264, such as pressure sensor(s) 266, vibration sensor(s) 268, temperature sensor(s) 270, and/or fluid condition sensor(s) 272, and/or electrical instruments 274 associated with the fracturing component module 14 (and/or the auxiliary system 170) and configured to generate signals indicative of parameters 268 associated with operation of components associated with the fracturing component section 14, for example, as described with respect to FIG. 6. For example, with respect to operation of a hydraulic fracturing pump, such parameters 276 may include hydraulic fracturing pump suction pressure, hydraulic fracturing pump discharge pressure, lubricant pressure, lubricant temperature, vibration associated with operation of the hydraulic fracturing pump, grease pump operation, grease pressure, and/or hydraulic fracturing pump cooler temperature. With respect to operation of a transmission, the parameters 276 may include lubricant pressure, lubricant temperature, vibration associated with operation of the transmission 20, transmission cooler temperature, parameters related to information generated by the transmission control module 202, and/or operation of the grease pump 200. With respect to operation of the internal combustion engine 18, the parameters 276 may include parameters related to information generated by the engine control module 206, as well as other engine-related parameters. With respect to operation of the auxiliary system 170, the parameters 266 may include pressure of the hydraulic system, temperature of the hydraulic system fluid, lubricant level, lubricant reservoir temperature, parameters related to operation of the hydraulic pump(s) 212, and/or parameters related to information generated by the auxiliary engine control module 222.

The component condition monitoring system 102 may include a condition monitoring controller 278 configured to receive the parameters 276 from the sensors 264 and/or the electrical instruments 274. In some embodiments, one or more the sensors 264 and/or electrical instruments 274 may not be part of the component condition monitoring system 102, but may instead merely communicate with the condition monitoring controller 278, for example, via communications lines and/or wirelessly according to communication protocols. Based at least in part on the parameters 276, the condition monitoring controller 278 may be configured to generate condition signals indicative of one or more of, for example, approaching maintenance due to be performed, predicted component damage, predicted component failure, existing component damage, existing component failure, irregularities of component operation, and/or operation exceeding rated operation. In some embodiments, the condition monitoring controller 278 may be configured to identify one or more of excessive pressure, excessive vibration, excessive temperature, fluid contamination, or fluid degradation associated with the fracturing component section 14 and/or the auxiliary system 170.

The condition monitoring controller 278 may be configured to communicate, via an output device 280 in communication with the condition monitoring controller 278, with an on-site operator of the fracturing component section 14 and/or auxiliary system 170, one or more of approaching maintenance due to be performed, predicted component damage, predicted component failure, existing component damage, existing component failure, irregularities of component operation, or operation exceeding rated operation. In some embodiments, the condition monitoring controller 278 may be configured to communicate, via the output device 280, with an on-site operator of the fracturing component section 14 and/or auxiliary system 170, excessive pressure, excessive vibration, excessive temperature, fluid contamination, and/or fluid degradation associated with the fracturing component section 14 and/or the auxiliary system 170. The output device 280 may include a display device including a graphical user interface, and/or an audible and/or visual alarm system configured to notify an operator of the information from the component condition monitoring system. In some embodiments, the component condition monitoring system 102 may include a transmitter 282 configured communicate condition signals to a location 284 remote from the fracturing component section 14 and/or the auxiliary system 170 indicative of the one or more of approaching maintenance due to be performed, component damage, predicted component failure, existing component damage, existing component failure, irregularities of component operation, and/or operation exceeding rated operation.

Some embodiments of the component condition monitoring system 102 and/or the condition monitoring controller 278 may be supplied with electrical power for operation via electrical power generated by the hydraulic fracturing unit 12 and/or the auxiliary system 170. As shown in FIG. 8, the component condition monitoring system 102 and/or the condition monitoring controller 278 may be supplied with electrical power for operation via an electrical power source 286, which may include, for example, one or more of batteries 288 (e.g., rechargeable batteries), an alternator 290, for example driven by the auxiliary engine 214 (see FIG. 6), an electrical power generation device 292 (e.g., a generator) driven by the auxiliary engine 214, and/or one or more solar panels 294. Other sources of electrical power are contemplated.

In some embodiments, the component condition monitoring system 102 may be incorporated into the supervisory control system 168. In some embodiments, the component condition monitoring system 102 may be independent from the supervisory control system 168. Some embodiments of the component condition monitoring system 102 may facilitate determining or estimating the operational condition of a fracturing component section 14, the auxiliary system 170, and/or the hydraulic fracturing unit 12, which may be displayed via the output device 280. For example, a newly-assembled and/or tested fracturing component section 14 including new and/or refurbished components may provide a baseline for the operational condition of the fracturing component section 14, the auxiliary system 170, and/or the hydraulic fracturing unit 12. Relative to the baseline operational condition, when abnormal operational parameters are detected, for example, by the condition monitoring controller 278, the condition monitoring controller 278 may indicate such abnormalities. For example, elevated vibrations associated with operation of the hydraulic fracturing pump 16 could be an indication of potential damage in the power end 86 (see FIG. 2A) due to wear and/or abrupt pumping conditions, a failure in the fluid end 88 related to consumables such as valves and/or valve seats. Elevated pressure in a lubrication system may be indicative of flow restrictions, for example, from collapsed fluid lines, clogged filters, and/or clogged spray nozzles. Reduced pressure in in the grease system may be indicative of a packing failure. Reduced cooling temperatures leaving lubrication radiators may be indicative of a reduced ability to cool fluid from clogged radiators (e.g., coolers). In some embodiments, the condition monitoring controller 278 may be configured to record time of operation and notify an operator that the fracturing component section 14, the auxiliary system 170, and/or the hydraulic fracturing unit 12 is approaching a service interval and/or a planned overhaul. In some embodiments, at least a portion of this data may be collected and/or stored in a total pump profile for association with an identifier (e.g., a number or code) unique to the fracturing component section 14, the auxiliary system 170, and/or the hydraulic fracturing unit 12. In some such examples, when a fracturing component section 14 (e.g., including a hydraulic fracturing pump 16) is replaced or exchanged, variables associated with the replaced or exchanged fracturing component may be incorporated into an overall score associated with an operational condition of the hydraulic fracturing unit 12, for example, with higher scores indicative of a relatively higher operational condition of the hydraulic fracturing unit 12.

Figure 9:
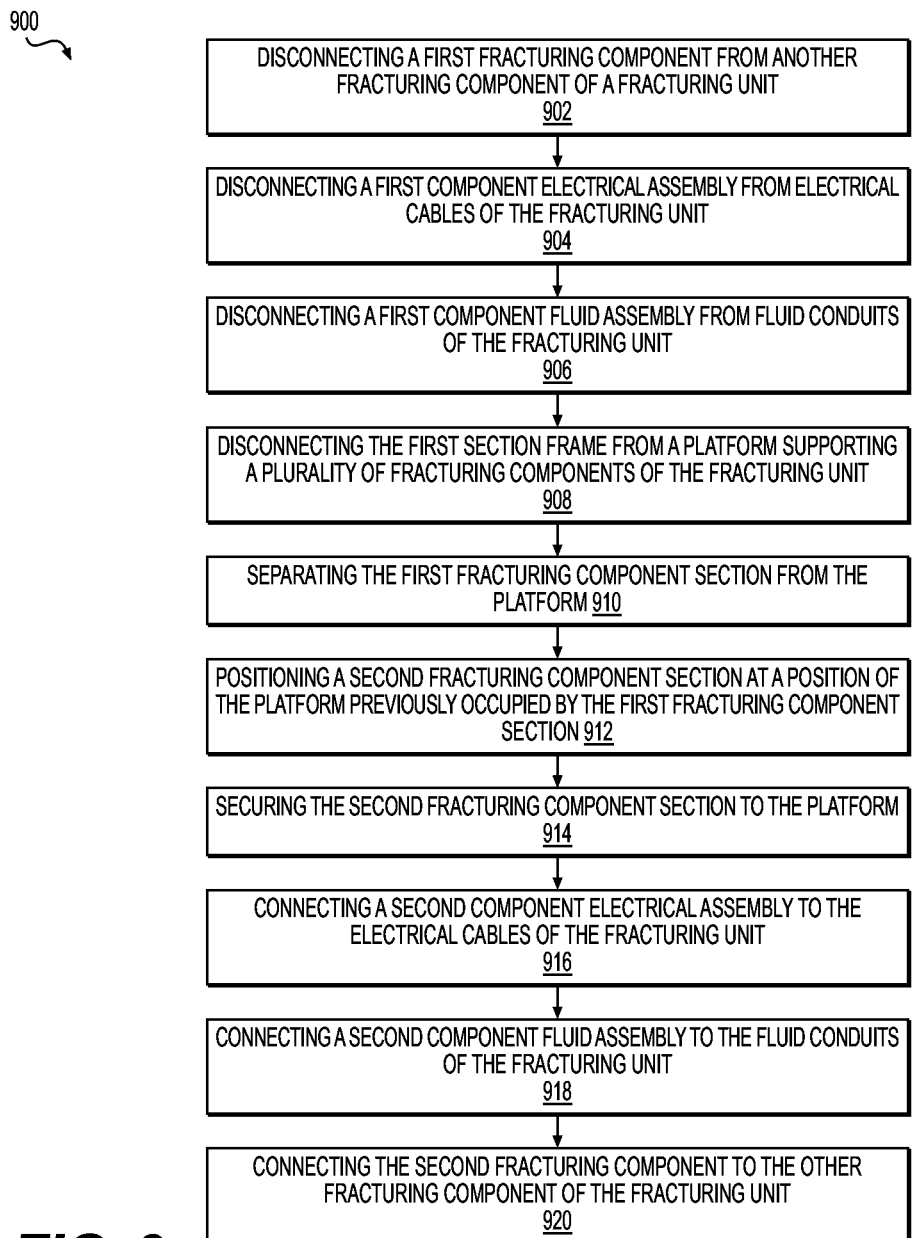
FIG. 9 is a block diagram of an example method for exchanging a first fracturing component of a fracturing system for a second fracturing component according to an embodiment of the disclosure.

FIG. 9 is a block diagram of an example method 900 for exchanging a first fracturing component of a hydraulic fracturing unit for a second fracturing component according to an embodiment of the disclosure, illustrated as a collection of blocks in a logical flow graph, which represent a sequence of operations. For example, if a hydraulic fracturing pump, engine, or transmission of a hydraulic fracturing unit is no longer operating properly, requires maintenance or service, or is imminently due for scheduled maintenance that requires removal of the fracturing component from the hydraulic fracturing unit, it may be exchanged for another fracturing component of the same type (i.e., a hydraulic fracturing pump, engine, or transmission). As noted previously herein, such an exchange is often complex and time consuming, resulting in significant down-time and inefficiencies of the affected fracturing operation.

FIG. 9 is a flow diagram of an embodiment of a method 900 for exchanging a first fracturing component of a hydraulic fracturing unit for a second fracturing component, for example, associated with a hydraulic fracturing system, according to an embodiment of the disclosure.

The example method 900, at 902, may include disconnecting the first fracturing component from another fracturing component of the hydraulic fracturing unit. In some embodiments, the first fracturing component may be connected to a first section frame including a first base for supporting the first fracturing component, and the first fracturing component and the first section frame may at least partially form a first fracturing component section. For example, the first fracturing component may include an internal combustion engine to supply power to a hydraulic fracturing pump, and disconnecting the internal combustion engine from a transmission connecting the internal combustion engine to a hydraulic fracturing pump may include disconnecting an output shaft of the internal combustion engine from a driveshaft of a transmission. In some embodiments, the first fracturing component may include a transmission to connect an output of an internal combustion engine to a driveshaft of a hydraulic fracturing pump, and disconnecting the transmission from the hydraulic fracturing pump may include (1) disconnecting a driveshaft of the transmission from an output shaft of an internal combustion engine, and (2) disconnecting an output shaft of the transmission from a driveshaft of the hydraulic fracturing pump. In some embodiments, the first fracturing component may include a hydraulic fracturing pump, and disconnecting the hydraulic fracturing pump from the transmission may include disconnecting a driveshaft shaft of the hydraulic fracturing pump from an output shaft of the transmission.

At 904, the example method 900 further may include disconnecting a first component electrical assembly from electrical cables of the hydraulic fracturing unit and/or a fracturing system including a plurality of fracturing units. For example, the first component electrical assembly may be connected to the first section frame and positioned to provide one or more of electrical power, electrical controls, or electrical monitoring components associated with operation of the first fracturing component. For example, the first fracturing component section may include a first coupling plate connected to the first section frame, and a plurality of first quick-connect electrical couplers may be connected to the first coupling plate. The plurality of first quick-connect electrical couplers may be electrically connected to respective electrical connections of the first component electrical assembly. Disconnecting the first component electrical assembly from the electrical cables of the hydraulic fracturing unit and/or fracturing system may include, for example, disconnecting the electrical cables of the hydraulic fracturing unit and/or fracturing system from the plurality of first quick-connect electrical couplers connected to the first coupling plate.

At 906, the example method 900 also may include disconnecting a first component fluid assembly from fluid conduits of the hydraulic fracturing unit and/or fracturing system. The first component fluid assembly may be connected to the first section frame and positioned to provide one or more of lubrication, cooling, hydraulic function, or fuel to operate the first fracturing component. For example, the first fracturing component section may include a first coupling plate connected to the first section frame and a plurality of first quick-connect fluid couplers connected to the first coupling plate. The first quick-connect fluid couplers may be connected to respective fluid conduits of the first component fluid assembly. In some such examples, disconnecting the first component fluid assembly from the fluid conduits of the hydraulic fracturing unit and/or fracturing system may include disconnecting the fluid conduits of the hydraulic fracturing unit and/or fracturing system from the plurality of first quick-connect fluid couplers connected to the first coupling plate.

The example method 900, at 908, further may include disconnecting the first section frame of the first fracturing component section from a platform supporting a plurality of fracturing components of the hydraulic fracturing unit. In some embodiments, this may include removing a plurality of fasteners securing the first section frame to the platform and/or unlocking a plurality of clamp locks securing the first section frame to the platform.

The example method 900, at 910, also may include separating the first fracturing component section from the platform. In some embodiments, this may include engaging lifting eyes connected to the first section frame, for example, with a crane and lifting the first fracturing component section from the platform, and/or passing forks of a fork truck through one or more recesses in the first section frame and separating the first fracturing component section from the platform.

At 912, the example method 900 also may include positioning a second fracturing component section at a position of the platform previously occupied by the first fracturing component section. The second fracturing component section may include a second section frame and the second fracturing component connected to and supported by the second section frame. In some embodiments, positioning a second fracturing component section may include engaging lifting eyes connected to the second section frame of the second component fracturing section with a crane and lifting the second fracturing component section into position on the platform, and/or passing forks of a fork truck through one or more recesses in the second section frame and moving the second fracturing component section into position on the platform.

At 914, the example method 900 may further include securing the second fracturing component section to the platform. For example, this may include aligning the second section frame with a section frame of one or more adjacent section frames of adjacent fracturing component sections, for example, using guide rails of the second section frame to align the second section frame with a section frame of the one or more adjacent section frames. This may also include using a plurality of fasteners to secure the second section frame to the platform and/or locking a plurality of clamp locks to secure the second section frame to the platform.

The example method 900, at 916 still further may include connecting a second component electrical assembly to the electrical cables of the hydraulic fracturing unit and/or the fracturing system. For example, the second component electrical assembly may be connected to the second section frame and positioned to provide one or more of electrical power, electrical controls, or electrical monitoring components associated with operation of the second fracturing component. In some embodiments, the second fracturing component section may include a second coupling plate connected to the second section frame and a plurality of second quick-connect electrical couplers connected to the second coupling plate. The plurality of second quick-connect electrical couplers may be electrically connected to respective electrical connections of the second component electrical assembly. In some embodiments, connecting the second component electrical assembly to the electrical cables of the hydraulic fracturing unit and/or fracturing system may include connecting the electrical cables of the hydraulic fracturing unit and/or fracturing system to the plurality of second quick-connect electrical couplers connected to the second coupling plate.

At 918, the example method 900 also may include connecting a second component fluid assembly to the fluid conduits of the hydraulic fracturing unit and/or the fracturing system. Some embodiments of the second component fluid assembly may be connected to the second section frame and positioned to provide lubrication, cooling, hydraulic function, and/or fuel to operate the second fracturing component. In some embodiments, the second fracturing component section may also include a second coupling plate connected to the second section frame and a plurality of second quick-connect fluid couplers connected to the second coupling plate. The second quick-connect fluid couplers may be connected to respective fluid conduits of the second component fluid assembly. In some such examples, connecting the second component fluid assembly to the fluid conduits of the hydraulic fracturing unit and/or fracturing system may include connecting the fluid conduits of the hydraulic fracturing unit and/or fracturing system to the plurality of second quick-connect fluid couplers connected to the second coupling plate.

The example method 900, at 920, further may include connecting the second fracturing component to the other fracturing component of the hydraulic fracturing unit. In some embodiments, this may depend on the type of fracturing components being connected to one another. For example, the first fracturing component may include an internal combustion engine to supply power to a hydraulic fracturing pump, and connecting the internal combustion engine and the other fracturing component may include connecting a transmission connecting the internal combustion engine to a hydraulic fracturing pump. Connecting the internal combustion engine to the transmission may include connecting the output shaft of the internal combustion engine to a driveshaft of a transmission. In some embodiments, the first fracturing component may include a transmission to connect an output of an internal combustion engine to a hydraulic fracturing pump, and connecting the transmission to the hydraulic fracturing pump may include (1) connecting a driveshaft of the transmission to the output shaft of the internal combustion engine, and (2) connecting the output shaft of the transmission to the driveshaft of the hydraulic fracturing pump. In some embodiments, the first fracturing component may include a hydraulic fracturing pump, and connecting the hydraulic fracturing pump to the transmission may include connecting the driveshaft of the hydraulic fracturing pump to the output shaft of the transmission.

Figure 10:
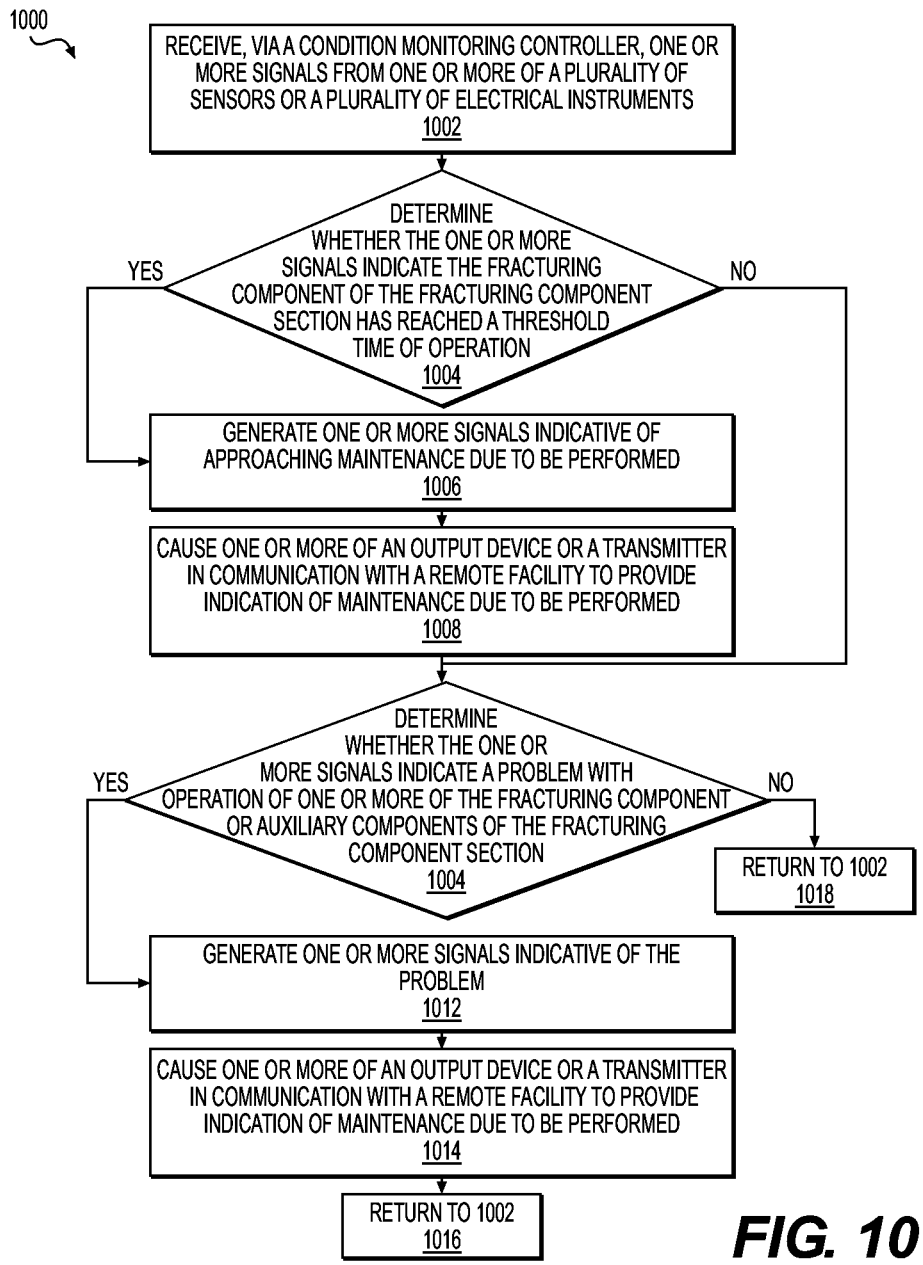
FIG. 10 is a block diagram of an example method for monitoring a condition of a fracturing component section according to an embodiment of the disclosure.

FIG. 10 is a block diagram of an embodiment of a method 1000 for monitoring a condition of a fracturing component section including a section frame and a fracturing component connected to the section frame, and as illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 10 is a flow diagram of an example method 1000 to monitoring a condition of a fracturing component section including a section frame and a fracturing component connected to the section frame, for example, as described herein. For example, the fracturing component section may include a plurality of sensors and/or a plurality of electrical instruments configured to generate one or more signals indicative of operation of the fracturing component and/or auxiliary components connected to the fracturing component section for facilitating operation of the fracturing component. In some embodiments, the method 1000 may be performed semi- or fully-autonomously, for example, via a condition monitoring controller and/or a supervisory control system. The method 1000 may be utilized in association with various systems, such as, for example, the example hydraulic fracturing system 10 shown in FIG. 1.

The example method 1000, at 1002, may include receiving, via a condition monitoring controller, one or more signals from one or more of the plurality of sensors or the plurality of electrical instruments. In some embodiments, the one or more of a plurality of sensors or a plurality of electrical instruments may be configured to connect to the fracturing component section and generate one or more signals indicative of operating parameters associated with operation of the fracturing component and/or auxiliary components associated with the fracturing component, for example, as described herein with respect to FIG. 6.

At 1004, the example method 1000 further may include determining, for example, via the condition monitoring controller, whether the one or more signals indicate the fracturing component of the fracturing component section has reached a threshold time of operation. For example, the threshold time of operation may be a predetermined and/or calculated time period of operation of the fracturing component at the end of which maintenance and/or service may be performed. For example, for a hydraulic fracturing pump, scheduled maintenance or service may be performed that replaces the valves and/or valve seats of the fluid end of a reciprocating hydraulic fracturing pump. In some embodiments, the time of operation may be predetermined, for example, based at least in part on the size and/or type of hydraulic fracturing pump, the power output of the internal combustion engine connected to the hydraulic fracturing pump, the content of the fracturing fluid pumped by the hydraulic fracturing pump, and/or relevant historical data. In some embodiments, the time of operation may be calculated during operation of the fracturing component based at least in part on correlation tables, correlation graphs, and/or empirically- and/or theoretically-derived formulas, for example, relating to operational parameters, such as the power output and/or work performed by the internal combustion engine during operation, the average and/or maximum engine speed, the amount of fuel used by the internal combustion engine, the volume and/or flow rate (the average and/or maximum flow rates) of fracturing fluid pumped, the type and/or content of the fracturing fluid, the average and/or maximum coolant temperature, the average and/or maximum lubricant temperature and/or pressure, the condition of the lubricant, and/or the type(s) of fuel(s) used to operate the internal combustion engine, etc.

If, at 1004, it has been determined that the fracturing component has reached the threshold of time of operation, at 1006, the example method 1000 may include generating, for example, via the condition monitoring controller, one or more signals (e.g., condition signals) indicative of approaching maintenance due to be performed, for example, on the fracturing component of the fracturing component section.

If, at 1004, it has been determined that the fracturing component has not reached the threshold time of operation, the example method 1000 may include skipping to 1010.

At 1008, the example method 1000 also may include causing, for example, via the condition monitoring controller, an output device and/or a transmitter in communication with a remote facility to provide an indication of maintenance (or service) due to be performed on the fracturing component. For example, the method may include causing a display device at the hydraulic fracturing component and/or on-site at the hydraulic fracturing operation to display the indication of maintenance or service due to be performed. This may include displaying the indication on a computer screen, a laptop screen, a smart phone, a computer tablet, and/or a purpose-built hand-held computing/receiving device and/or a screen connected to the hydraulic fracturing unit. In some embodiments, the indication may be transmitted to a remote facility, such as a management facility and/or service facility. In some embodiments, the condition monitoring controller may include, and/or be in communication with, a transmitter (or transceiver) configured to communicate via a communications link (hard-wired and/or wireless) to a remotely located fracturing operation management facility or service or maintenance facility, which may be monitoring and/or controlling operation of the hydraulic fracturing unit and/or the fracturing component section, for example, as described herein with respect to FIG. 8. In some embodiments, the indication may include an audible alarm and/or a visual alarm, such as the sounding of a horn and/or the illumination of a light to draw attention to the indication.

If, at 1004, it has been determined that the fracturing component has not reached the threshold time of operation, or following 1008, at 1010, the example method 1000 may include determining, for example, via the condition monitoring controller, whether the one or more signals indicate a problem with operation of the fracturing component and/or auxiliary components of the fracturing component section. For example, the one or more signals may include signals indicative of excessive pressure, excessive vibration, excessive temperature, fluid contamination, and/or fluid degradation associated with operation of the fracturing component and/or auxiliary components of the fracturing component section, for example, as described herein with respect to FIG. 8.

If, at 1010, it has been determined that the one or more signals indicate a problem with operation of the fracturing component and/or auxiliary components of the fracturing component section, at 1012, the example method 1000 further may include generating, for example, via the condition monitoring controller, one or more signals indicative of the problem. For example, the one or more signals may include signals (e.g., condition signals) indicative of predicted component damage, predicted component failure, existing component damage, existing component failure, irregularities of component operation, and/or operation exceeding rated operation. For example, the condition monitoring controller may be configured to generate the one or more condition signals, as described herein with respect to FIG. 8.

If, at 1010, it has been determined that the fracturing component and auxiliary components of the fracturing component section are not experiencing a problem, the example method 1000 may return to 1002 to re-start the method 1000.

At 1014, the example method 1000 also may include causing, for example, via the condition monitoring controller, an output device and/or a transmitter in communication with a remote facility to provide an indication of maintenance (or service) due to be performed on the fracturing component. For example, the method may include causing a display device at the hydraulic fracturing component and/or on-site at the hydraulic fracturing operation to display the indication of maintenance or service due to be performed, which may include repair or replacement of the fracturing component and/or the one or more auxiliary components indicated as exhibiting a problem. This may include displaying the indication on a computer screen, a laptop screen, a smart phone, a computer tablet, and/or a purpose-built hand-held computing/receiving device and/or a screen connected to the hydraulic fracturing unit. In some embodiments, the indication may be transmitted to a remote facility, such as a fracturing operation management facility or service or maintenance facility, which may be monitoring and/or controlling operation of the hydraulic fracturing unit and/or the fracturing component section, for example, as described herein with respect to FIG. 8. In some embodiments, the indication may include an audible alarm and/or a visual alarm, such as the sounding of a horn and/or the illumination of a light to draw attention to the indication.

In some embodiments, following 1014, the fracturing component section may be exchanged for another fracturing component section including the same, or similar, type of fracturing component (e.g., the same or similar type of hydraulic fracturing pump, transmission, or internal combustion engine), for example, as described herein with respect to FIGS. 1-8. This may reduce the complexity and/or down-time associated with replacing the affected fracturing component (or auxiliary components) or removing the affected fracturing component from the hydraulic fracturing unit, transporting the affected fracturing component to an off-site maintenance or service facility (e.g., a repair facility), repairing or replacing the affected fracturing component, transporting it back to the site of the fracturing operation, and re-installing the fracturing component on the hydraulic fracturing unit. Rather, in some embodiments, a second fracturing component section including a replacement fracturing component for the affected fracturing component may be exchanged for the fracturing component section including the affected fracturing component (or auxiliary component), which may involve reduced complexity and time relative to the previously described repair/replacement procedure.

If, at 1010, it has been determined that the fracturing component and auxiliary components of the fracturing component section are not experiencing a problem, or following 1014, the example method 1000, at 1016 and 1018, may include returning to 1002 to re-start the method 1000. In this example manner, the component condition monitoring controller may monitor the operational condition of the components of a fracturing component section, including the fracturing component and the auxiliary components, identify any scheduled maintenance requirements, identify any problems with operation and/or the condition of the fracturing component and/or auxiliary components, and/or provide an indication of such maintenance and/or problems, on-site and/or to an off-site facility.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

The condition monitoring controller 278 (see, e.g., FIG. 8) may include one or more industrial control systems (ICS), such as supervisory control and data acquisition (SCADA) systems, distributed control systems (DCS), and/or programmable logic controllers (PLCs). For example, the controller 80 may include one or more processors, which may operate to perform a variety of functions, as set forth herein. In some embodiments, the processor(s) may include a central processing unit (CPU), a graphics processing unit (GPU), both CPU and GPU, or other processing units or components. Additionally, at least some of the processor(s) may possess local memory, which also may store program modules, program data, and/or one or more operating systems. The processor(s) may interact with, or include, computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may be configured to store computer-executable instructions, which when executed by a computer, perform various operations associated with the processor(s) to perform the operations described herein.

Example embodiments of the condition monitoring controller 278 may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the embodiments of the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A method to monitor a condition of a first fracturing component section including a first hydraulic fracturing component of a hydraulic fracturing unit and to exchange the first fracturing component section for a second fracturing component section including a second hydraulic fracturing component, each of the first and second fracturing component sections being fracturing unit components, the method comprising:

receiving, via a condition monitoring controller, one or more signals from one or more of a plurality of sensors connected to the first fracturing component section; and generating, based at least in part on the one or more signals, one or more condition signals associated with the first fracturing component section;

communicating the one or more condition signals: (a) via an output device in communication with the condition monitoring controller, (b) to an on-site operator of the first fracturing component section, or (c) via a transmitter to a location remote from the first fracturing component section; and exchanging, based at least in part on the communicating, the first fracturing component section for the second fracturing component section including the second hydraulic fracturing component, the first and second fracturing component sections each being supported by first and second section frames, respectively, the first and second section frames each including a base that supports the first and second fracturing component sections, respectively, the exchanging being done by moving the first and second fracturing component sections together with the first and second section frames, respectively, and the exchanging comprises: (a) disconnecting and connecting one or more electrical and fluid couplers connected to at least one coupling plate attached to an outside portion of each of the first and second section frames, (b) disconnecting the first fracturing component section from another fracturing component section of the hydraulic fracturing unit, the first fracturing component section and another fracturing component section including one or more of a functioning pump, transmission or internal combustion engine of a hydraulic fracturing system, at least one of the at least one or more functioning pump, transmission or internal combustion engine includes auxiliary components used to operate the first fracturing component section, (c) disconnecting a first section frame of the first fracturing component section from a platform supporting a plurality of fracturing component sections of the hydraulic fracturing unit, the first section frame including a base that supports the first fracturing component section, and one or more opposing guide rails, the opposing guide rails configured to assist with at least one of alignment of the first fracturing component section on the platform, and alignment of the first fracturing component section with the another fracturing component section, (d) separating the first fracturing component section from the platform, (e) positioning the second fracturing component section at a position of the platform previously occupied by the first fracturing component section, the second fracturing component section including one or more of a functioning pump, transmission, or internal combustion engine of a hydraulic fracturing system and corresponding to the disconnected and separated first fracturing component section, (f) securing the second fracturing component section to the platform, and (g) connecting the second fracturing component section to another fracturing component section of the hydraulic fracturing unit.

2. The method of claim 1, wherein generating the one or more condition signals associated with the first fracturing component section comprises generating one or more signals indicative of one or more of approaching maintenance due to be performed, predicted component damage, predicted component failure, existing component damage, existing component failure, irregularities of component operation, or operation exceeding rated operation.

3. The method of claim 1, wherein receiving the one or more signals comprises receiving one or more signals generated by one or more of a pressure sensor, a vibration sensor, a temperature sensor, or a fluid condition sensor, the method further comprising:

identifying, via the condition monitoring controller, one or more of excessive pressure, excessive vibration, excessive temperature, fluid contamination, or fluid degradation associated with the first fracturing component section.

4. The method of claim 1, wherein the condition monitoring controller comprises a first condition monitoring controller, and the second fracturing component section comprises a second condition monitoring controller, the method further comprising:

generating, via the second condition monitoring controller, one or more second condition signals associated with the second fracturing component section.

5. The method of claim 4, further comprising one or more of communicating the one or more second condition signals:

via a second output device in communication with the second condition monitoring controller, with an on-site operator; or via a second transmitter in communication with the second condition monitoring controller, to a location remote from the second fracturing component section.

6. The method of claim 4, wherein generating the one or more second condition signals associated with the second fracturing component section comprises generating, via the second condition monitoring controller, one or more signals indicative of one or more of: (a) approaching maintenance due to be performed on the second fracturing component section, (b) predicted component damage associated with the second fracturing component section, (c) predicted component failure associated with the second fracturing component section, (d) existing component damage associated with the second fracturing component section, (e) existing component failure associated with the second fracturing component section, (f) irregularities of component operation associated with the second fracturing component section, or (g) operation exceeding rated operation associated with the second fracturing component section.

7. The method claim 4, further comprising:
comparing (1) the one or more condition signals associated with the first fracturing component section with (2) the one or more second condition signals associated with the second fracturing component section; and
wherein the exchanging is based at least in part on the comparing, wherein each of the first fracturing component section and the second fracturing component section including one or more of a functioning pump, transmission, or internal combustion engine of a hydraulic fracturing system.

8. The method of claim 1, further comprising:
disconnecting one or more of (1) a first component electrical assembly of the first fracturing component section from electrical cables of the hydraulic fracturing unit or (2) a first component fluid assembly of the first fracturing component section from fluid conduits of the hydraulic fracturing unit; and
connecting one or more of (1) a second component electrical assembly of the second fracturing component section to the electrical cables of the hydraulic fracturing unit or (2) connecting a second component fluid assembly of the second fracturing component section to the fluid conduits of a hydraulic fracturing unit, wherein the disconnecting of the first component electrical assembly and the first component fluid assembly and connecting of the second component electrical assembly and second component fluid assembly comprises disconnecting and connecting the one or more electrical and fluid couplers.

9. The method of claim 1, wherein:
the internal combustion engine of the first fracturing component section supplies power to the pump of the another fracturing component section; and
disconnecting the first fracturing component section from another fracturing component section of the hydraulic fracturing unit comprises disconnecting an output shaft of the internal combustion engine of the first fracturing component section from a driveshaft of the transmission of the another fracturing component section; and
disconnecting the first section frame of the first fracturing component from the platform comprises using a lifting eye formed in the first section frame.

10. The method of claim 1, wherein:
the transmission of the first fracturing component section connects an output of the internal combustion engine of the another fracturing component section to a pump of a third fracturing component section; and
disconnecting the first fracturing component section from another fracturing component of the hydraulic fracturing unit comprises:
disconnecting a driveshaft of the transmission of the first fracturing component section from an output shaft of the internal combustion engine of the another fracturing component section; and
disconnecting an output shaft of the transmission of the first fracturing component section from a driveshaft shaft of the pump of the third fracturing component section.

11. The method of claim 1, the first fracturing component section comprises a hydraulic fracturing pump; and
disconnecting the first fracturing component section from the another fracturing component section of the hydraulic fracturing unit comprises disconnecting a driveshaft shaft of the pump of the first fracturing component section from an output shaft of the transmission of the another fracturing component section.

12. The method of claim 1, wherein the electrical and fluid couplers are quick-connect electrical couplers and quick-connect fluid couplers, respectively.

13. A method to monitor a condition of a first fracturing component section including a first hydraulic fracturing component of a hydraulic fracturing unit and to exchange the first fracturing component section for a second fracturing component section including a second hydraulic fracturing component, the method comprising:
(1) receiving, via a condition monitoring controller, one or more signals from one or more of a plurality of sensors connected to the first fracturing component section; and
(2) generating, based at least in part on the one or more signals, one or more condition signals associated with the first fracturing component section;
(3) communicating the one or more condition signals: (a) via an output device in communication with the condition monitoring controller, (b) to an on-site operator of the first fracturing component section, or (c) via a transmitter to a location remote from the first fracturing component section; and
(4) exchanging, based at least in part on the communicating, the first fracturing component section for the second fracturing component section including the second hydraulic fracturing component, the first and second fracturing component sections each comprise a first and second section frame, respectively, and each section frame comprises a base for supporting a corresponding fracturing component section, the exchanging being done by moving the first and second fracturing component sections together with the first and second section frames, respectively, the exchanging comprises (a) disconnecting and connecting one or more electrical and fluid couplers connected to at least one coupling plate attached to an outside portion of each of the first and second section frames, (b), disconnecting the first fracturing component section from another fracturing component section of the hydraulic fracturing unit, the first fracturing component section including one or more of a functioning pump, transmission, or internal combustion engine of a hydraulic fracturing system, (c) disconnecting a first section frame of the first fracturing component section from a platform supporting a plurality of fracturing component sections of the hydraulic fracturing unit, separating the first fracturing component section from the platform, the separating of the first fracturing component section from the platform includes use of one or more recesses formed in opposing guide rails of each base that support a fracturing component section, (d) positioning the second fracturing component section at a position of the platform previously occupied by the first fracturing component section, the second fracturing component section including one or more of a functioning pump, transmission, or internal combustion engine of a hydraulic fracturing system and corresponding to the disconnected and separated first fracturing component section, (e) securing the second fracturing component section to the platform, and (f) connecting the second fracturing component section to the another fracturing component section of the hydraulic fracturing unit.

14. A method to monitor a condition of a first fracturing component section including a first hydraulic fracturing component of a hydraulic fracturing unit and to exchange the first fracturing component section for a second fracturing component section including a second hydraulic fracturing component, each of the first and second fracturing component sections being fracturing unit components, the method comprising:
(1) receiving, via a condition monitoring controller, one or more signals from one or more of a plurality of sensors connected to the first fracturing component section; and
(2) generating, based at least in part on the one or more signals, one or more condition signals associated with the first fracturing component section;
(3) communicating the one or more condition signals: (a) via an output device in communication with the condition monitoring controller, (b) to an on-site operator of the first fracturing component section, or (c) via a transmitter to a location remote from the first fracturing component section; and
(4) exchanging, based at least in part on the communicating, the first fracturing component section for the second fracturing component section including the second hydraulic fracturing component, the first and second fracturing component sections each being supported by first and second section frames, respectively, the first and second section frames each including a base that supports the first and second fracturing component sections, respectively, the exchanging being done by moving the first and second fracturing component sections together with the first and second section frames, respectively, and the exchanging comprises: (a) disconnecting and connecting one or more electrical and fluid couplers connected to at least one coupling plate attached to an outside portion of each of the first and second section frames, (b) disconnecting the first fracturing component section from another fracturing component section of the hydraulic fracturing unit, the first fracturing component section including one or more of a functioning pump, transmission, or internal combustion engine of a hydraulic fracturing system, (c) disconnecting a first section frame of the first fracturing component section from a platform supporting a plurality of fracturing component sections of the hydraulic fracturing unit, the disconnecting comprising disconnecting fasteners received in holes formed in the base, (d) separating the first fracturing component section from the platform, (e) positioning the second fracturing component section at a position of the platform previously occupied by the first fracturing component section, the second fracturing component section including one or more of a functioning pump, transmission, or internal combustion engine of a hydraulic fracturing system and corresponding to the disconnected and separated first fracturing component section, (f) securing the second fracturing component section to the platform, and (g) connecting the second fracturing component section to another fracturing component section of the hydraulic fracturing unit.

* * * * *